(12) United States Patent
Chang et al.

(10) Patent No.: US 12,038,613 B2
(45) Date of Patent: Jul. 16, 2024

(54) BEHIND-THE-WALL OPTICAL CONNECTOR AND ASSEMBLY OF THE SAME

(71) Applicant: Senko Advanced Components, Inc., Marlborough, MA (US)

(72) Inventors: Jimmy Chang, Worcester, MA (US); Kazuyoshi Takano, Tokyo (JP); Jeffrey Gniadek, Oxford, ME (US)

(73) Assignee: Senko Advanced Components, Inc., Hudson, MA (US)

( * ) Notice: Subject to any disclaimer, the term of this patent is extended or adjusted under 35 U.S.C. 154(b) by 500 days.

(21) Appl. No.: 16/877,384

(22) Filed: May 18, 2020

(65) Prior Publication Data

US 2020/0310041 A1    Oct. 1, 2020

Related U.S. Application Data

(63) Continuation-in-part of application No. 16/835,277, filed on Mar. 30, 2020, now Pat. No. 11,579,379.

(60) Provisional application No. 62/864,284, filed on Jun. 20, 2019, provisional application No. 62/849,045, filed on May 16, 2019, provisional application No. 62/825,778, filed on Mar. 28, 2019.

(51) Int. Cl.
    *G02B 6/38*    (2006.01)
(52) U.S. Cl.
    CPC ......... *G02B 6/3897* (2013.01); *G02B 6/3821* (2013.01); *G02B 6/3825* (2013.01); *G02B 6/387* (2013.01); *G02B 6/3893* (2013.01)

(58) Field of Classification Search
    CPC ... G02B 6/3825; G02B 6/3821; G02B 6/3887
    See application file for complete search history.

(56) References Cited

U.S. PATENT DOCUMENTS

| 3,721,945 | A | 3/1973 | Hults |
| 4,150,790 | A | 4/1979 | Potter |
| 4,312,564 | A | 1/1982 | Cefarelli |
| 4,327,964 | A | 5/1982 | Haesly |
| 4,478,473 | A | 10/1984 | Frear |
| 4,762,388 | A | 8/1988 | Tanaka |
| 4,764,129 | A | 8/1988 | Jones |

(Continued)

FOREIGN PATENT DOCUMENTS

| CA | 2495693 A1 | 4/2004 |
| CN | 2836038 Y | 11/2006 |

(Continued)

OTHER PUBLICATIONS

European Search Report and Written Opinion dated Mar. 3, 2015 for EP 14187661.

(Continued)

*Primary Examiner* — Sung H Pak
*Assistant Examiner* — Hoang Q Tran

(57) ABSTRACT

A behind-the-wall optical connector having an outer housing configured to be inserted into an adapter with a corresponding inner surface, and a latch is attached to at least one side of housing configured to lock the connecter into an adapter opening. A backbody, an integrated backbody or an external clip retains the ferrule assembly with a ferrule, biased forward toward a proximal end of the connector housing.

10 Claims, 24 Drawing Sheets

(56) References Cited

U.S. PATENT DOCUMENTS

| | | |
|---|---|---|
| 4,840,451 A | 6/1989 | Sampson |
| 4,872,736 A | 10/1989 | Myers |
| 4,979,792 A | 12/1990 | Weber |
| 5,026,138 A | 6/1991 | Boudreau |
| 5,041,025 A | 8/1991 | Haitmanek |
| D323,143 S | 1/1992 | Ohkura et al. |
| D333,504 S | 2/1993 | Myojo |
| 5,212,752 A | 5/1993 | Stephenson |
| 5,265,181 A | 11/1993 | Chang |
| 5,289,554 A | 2/1994 | Cubukciyan |
| 5,317,663 A | 5/1994 | Beard |
| 5,335,301 A | 8/1994 | Newman |
| 5,348,487 A | 9/1994 | Marazzi |
| 5,414,790 A | 5/1995 | Lee |
| 5,444,806 A | 8/1995 | de Marchi |
| 5,481,634 A | 1/1996 | Anderson |
| 5,506,922 A | 4/1996 | Grois |
| 5,521,997 A | 5/1996 | Rovenolt |
| 5,570,445 A | 10/1996 | Chou |
| 5,588,079 A | 12/1996 | Tanabe |
| 5,602,951 A | 2/1997 | Shiota |
| 5,684,903 A | 11/1997 | Kyomasu |
| 5,687,268 A | 11/1997 | Stephenson |
| 5,781,681 A | 7/1998 | Manning |
| 5,845,036 A | 12/1998 | De Marchi |
| 5,915,987 A | 6/1999 | Reed |
| 5,937,130 A | 8/1999 | Amberg |
| 5,956,444 A | 9/1999 | Duda |
| 5,971,626 A | 10/1999 | Knodell |
| 6,041,155 A | 3/2000 | Anderson |
| 6,049,040 A | 4/2000 | Biles |
| 6,134,370 A | 10/2000 | Childers |
| 6,178,283 B1 | 1/2001 | Weigel |
| RE37,080 E | 3/2001 | Stephenson |
| 6,206,577 B1 | 3/2001 | Hall, III |
| 6,206,581 B1 | 3/2001 | Driscoll |
| 6,227,717 B1 | 5/2001 | Ott |
| 6,238,104 B1 | 5/2001 | Yamakawa |
| 6,247,849 B1 | 6/2001 | Liu |
| 6,250,817 B1 | 6/2001 | Lampert |
| 6,276,840 B1 | 8/2001 | Weiss |
| 6,309,113 B1 | 10/2001 | Naito |
| 6,364,537 B1 | 4/2002 | Maynard |
| 6,371,657 B1 | 4/2002 | Chen |
| 6,379,052 B1 | 4/2002 | de Jong |
| 6,422,759 B1 | 7/2002 | Kevern |
| 6,461,054 B1 | 10/2002 | Iwase |
| 6,471,412 B1 | 10/2002 | Belenkiy |
| 6,478,472 B1 | 11/2002 | Anderson |
| 6,485,194 B1 | 11/2002 | Shirakawa |
| 6,530,696 B1 | 3/2003 | Ueda |
| 6,551,117 B2 | 4/2003 | Poplawski |
| 6,565,262 B2 | 5/2003 | Childers |
| 6,579,014 B2 | 6/2003 | Melton |
| 6,585,194 B1 | 7/2003 | Brushwood |
| 6,634,796 B2 | 10/2003 | de Jong |
| 6,634,801 B1 | 10/2003 | Waldron |
| 6,648,520 B2 | 11/2003 | McDonald |
| 6,668,113 B2 | 12/2003 | Togami |
| 6,682,228 B2 | 1/2004 | Rathnam |
| 6,685,362 B2 | 2/2004 | Burkholder |
| 6,695,486 B1 | 2/2004 | Falkenberg |
| 6,705,765 B2 | 3/2004 | Lampert |
| 6,854,894 B1 | 2/2005 | Yunker |
| 6,869,227 B2 | 3/2005 | Del Grosso |
| 6,872,039 B2 | 3/2005 | Baus |
| 6,935,789 B2 | 8/2005 | Gross, III |
| 7,036,993 B2 | 5/2006 | Luther |
| 7,052,186 B1 | 5/2006 | Bates |
| 7,077,576 B2 | 7/2006 | Luther |
| 7,090,406 B2 | 8/2006 | Melton |
| 7,090,407 B2 | 8/2006 | Melton |
| 7,091,421 B2 | 8/2006 | Kukita |
| 7,111,990 B2 | 9/2006 | Melton |
| 7,113,679 B2 | 9/2006 | Melton |
| D533,504 S | 12/2006 | Lee |
| D534,124 S | 12/2006 | Taguchi |
| 7,150,567 B1 | 12/2006 | Luther |
| 7,153,041 B2 | 12/2006 | Mine |
| 7,198,409 B2 | 4/2007 | Smith |
| 7,207,724 B2 | 4/2007 | Gurreri |
| D543,146 S | 5/2007 | Chen et al. |
| 7,258,493 B2 | 8/2007 | Milette |
| 7,261,472 B2 * | 8/2007 | Suzuki ................ G02B 6/3807 385/60 |
| 7,264,402 B2 | 9/2007 | Theuerkorn |
| 7,281,859 B2 | 10/2007 | Mudd |
| D558,675 S | 1/2008 | Chien et al. |
| 7,315,682 B1 | 1/2008 | En Lin |
| 7,325,976 B2 | 2/2008 | Gurreri |
| 7,325,980 B2 | 2/2008 | Pepe |
| 7,329,137 B2 | 2/2008 | Martin |
| 7,331,718 B2 | 2/2008 | Yazaki |
| 7,354,291 B2 | 4/2008 | Caveney |
| 7,371,082 B2 | 5/2008 | Zimmel |
| 7,387,447 B2 | 6/2008 | Mudd |
| 7,390,203 B2 | 6/2008 | Murano |
| D572,661 S | 7/2008 | En Lin et al. |
| 7,431,604 B2 | 10/2008 | Waters |
| 7,463,803 B2 | 12/2008 | Cody |
| 7,465,180 B2 | 12/2008 | Kusuda |
| 7,473,124 B1 | 1/2009 | Briant |
| 7,510,335 B1 | 3/2009 | Su |
| 7,513,695 B1 | 4/2009 | Lin |
| 7,540,666 B2 | 6/2009 | Luther |
| 7,561,775 B2 | 7/2009 | Lin |
| 7,588,373 B1 | 9/2009 | Sato |
| 7,591,595 B2 | 9/2009 | Lu |
| 7,594,766 B1 | 9/2009 | Sasser |
| 7,641,398 B2 | 1/2010 | O'Riorden |
| 7,695,199 B2 | 4/2010 | Teo |
| 7,699,533 B2 | 4/2010 | Milette |
| 7,712,970 B1 | 5/2010 | Lee |
| 7,824,113 B2 | 11/2010 | Wong |
| 7,837,395 B2 | 11/2010 | Lin |
| 7,903,922 B2 | 3/2011 | Momotsu |
| D641,708 S | 7/2011 | Yamauchi |
| 8,083,450 B1 | 12/2011 | Smith |
| 8,152,385 B2 | 4/2012 | de Jong |
| 8,186,890 B2 | 5/2012 | Lu |
| 8,192,091 B2 | 6/2012 | Hsu |
| 8,202,009 B2 | 6/2012 | Lin |
| 8,221,007 B2 | 7/2012 | Peterhans |
| 8,251,733 B2 | 8/2012 | Wu |
| 8,267,595 B2 | 9/2012 | Lin |
| 8,270,796 B2 | 9/2012 | Nhep |
| 8,408,815 B2 | 4/2013 | Lin |
| 8,465,317 B2 | 6/2013 | Gniadek |
| 8,534,928 B2 | 9/2013 | Cooke |
| 8,556,645 B2 | 10/2013 | Crain |
| 8,559,781 B2 | 10/2013 | Childers |
| 8,622,634 B2 | 1/2014 | Arnold |
| 8,636,424 B2 | 1/2014 | Kuffel |
| 8,651,749 B2 | 2/2014 | Dainese Júnior |
| 8,676,022 B2 | 3/2014 | Jones |
| 8,678,670 B2 | 3/2014 | Takahashi |
| 8,727,638 B2 | 5/2014 | Lee |
| 8,770,863 B2 | 7/2014 | Cooke |
| 9,052,474 B2 | 6/2015 | Jiang |
| 9,188,747 B2 | 11/2015 | Gniadek |
| 9,250,402 B2 | 2/2016 | Ishii |
| 9,310,569 B2 | 4/2016 | Lee |
| 9,366,829 B2 | 6/2016 | Czosnowski |
| 9,411,110 B2 | 8/2016 | Barnette, Jr. |
| 9,465,172 B2 | 10/2016 | Shih |
| 9,494,744 B2 | 11/2016 | de Jong |
| 9,548,557 B2 | 1/2017 | Liu |
| 9,551,842 B2 | 1/2017 | Theuerkorn |
| 9,557,495 B2 | 1/2017 | Raven |
| 9,568,686 B2 | 2/2017 | Fewkes |
| 9,581,768 B1 | 2/2017 | Baca |
| 9,599,778 B2 | 3/2017 | Wong |
| 9,658,409 B2 | 5/2017 | Gniadek |
| 9,684,130 B2 | 6/2017 | Veatch |

(56) References Cited

U.S. PATENT DOCUMENTS

| | | |
|---|---|---|
| 9,684,134 B2 | 6/2017 | Anderson et al. |
| 9,684,136 B2 | 6/2017 | Cline |
| 9,684,313 B2 | 6/2017 | Chajec |
| 9,709,753 B1 | 7/2017 | Chang |
| 9,726,830 B1 | 8/2017 | Gniadek |
| 9,778,425 B2 | 10/2017 | Nguyen |
| 9,829,644 B2 | 11/2017 | Nguyen |
| 9,829,645 B2 | 11/2017 | Good |
| 9,829,652 B2 | 11/2017 | Watanabe et al. |
| 9,869,825 B2 | 1/2018 | Bailey |
| 9,880,361 B2 | 1/2018 | Childers |
| 9,946,035 B2 | 4/2018 | Gustafson |
| 9,948,370 B2 | 4/2018 | Seok |
| 9,971,103 B2 | 5/2018 | de Jong |
| 10,031,296 B2 | 7/2018 | Good |
| 2002/0168148 A1 | 11/2002 | Gilliland |
| 2002/0172467 A1 | 11/2002 | Anderson |
| 2002/0191919 A1 | 12/2002 | Nolan |
| 2003/0053787 A1 | 3/2003 | Lee |
| 2003/0063862 A1 | 4/2003 | Fillion |
| 2003/0095754 A1 | 5/2003 | Matsumoto |
| 2003/0157825 A1 | 8/2003 | Kane |
| 2004/0038558 A1 | 2/2004 | Langouet et al. |
| 2004/0052473 A1 | 3/2004 | Seo |
| 2004/0109646 A1 | 6/2004 | Anderson |
| 2004/0136657 A1 | 7/2004 | Ngo |
| 2004/0141693 A1 | 7/2004 | Szilagyi |
| 2004/0161958 A1 | 8/2004 | Togami |
| 2004/0234209 A1 | 11/2004 | Cox |
| 2004/0247252 A1 | 12/2004 | Ehrenreich |
| 2005/0111796 A1 | 5/2005 | Matasek |
| 2005/0141817 A1 | 6/2005 | Yazaki |
| 2005/0250379 A1* | 11/2005 | Coffey ................. H01R 13/741 |
| | | 439/544 |
| 2006/0013539 A1 | 1/2006 | Thaler |
| 2006/0089049 A1 | 4/2006 | Sedor |
| 2006/0127025 A1 | 6/2006 | Haberman |
| 2006/0160429 A1 | 7/2006 | Dawiedczyk |
| 2006/0269194 A1 | 11/2006 | Luther |
| 2006/0274411 A1 | 12/2006 | Yamauchi |
| 2007/0025665 A1 | 2/2007 | Dean |
| 2007/0028409 A1 | 2/2007 | Yamada |
| 2007/0079854 A1 | 4/2007 | You |
| 2007/0098329 A1 | 5/2007 | Shimoji |
| 2007/0149062 A1 | 6/2007 | Long |
| 2007/0230874 A1 | 10/2007 | Lin |
| 2007/0232115 A1 | 10/2007 | Burke |
| 2007/0243749 A1 | 10/2007 | Wu |
| 2008/0008430 A1 | 1/2008 | Kewitsch |
| 2008/0044137 A1 | 2/2008 | Luther |
| 2008/0056647 A1 | 3/2008 | Margolin |
| 2008/0069501 A1 | 3/2008 | Mudd |
| 2008/0101757 A1 | 5/2008 | Lin |
| 2008/0226237 A1 | 9/2008 | O'Riorden |
| 2008/0267566 A1 | 10/2008 | En Lin |
| 2009/0022457 A1 | 1/2009 | de Jong |
| 2009/0028507 A1 | 1/2009 | Jones |
| 2009/0047818 A1 | 2/2009 | Irwin |
| 2009/0092360 A1 | 4/2009 | Lin |
| 2009/0176401 A1 | 7/2009 | Gu |
| 2009/0196555 A1 | 8/2009 | Lin |
| 2009/0214162 A1 | 8/2009 | O'Riorden |
| 2009/0220197 A1 | 9/2009 | Gniadek |
| 2009/0220200 A1 | 9/2009 | Sheau Tung Wong |
| 2009/0290839 A1 | 11/2009 | Lin |
| 2009/0290938 A1 | 11/2009 | Asaoka |
| 2010/0034502 A1 | 2/2010 | Lu |
| 2010/0092136 A1 | 4/2010 | Nhep |
| 2010/0247041 A1 | 9/2010 | Szilagyi |
| 2010/0284656 A1 | 11/2010 | Morra |
| 2010/0322561 A1 | 12/2010 | Lin |
| 2011/0044588 A1 | 2/2011 | Larson |
| 2011/0131801 A1 | 6/2011 | Nelson |
| 2011/0155810 A1 | 6/2011 | Taniguchi |
| 2011/0177710 A1 | 7/2011 | Tobey |
| 2011/0239220 A1 | 9/2011 | Gibson |
| 2012/0099822 A1 | 4/2012 | Kuffel |
| 2012/0155810 A1 | 6/2012 | Nakagawa |
| 2012/0189260 A1 | 7/2012 | Kowalczyk |
| 2012/0237177 A1 | 9/2012 | Minota |
| 2012/0269485 A1 | 10/2012 | Haley |
| 2012/0301080 A1 | 11/2012 | Gniadek |
| 2013/0019423 A1 | 1/2013 | Srutkowski |
| 2013/0071067 A1 | 3/2013 | Lin |
| 2013/0089995 A1 | 4/2013 | Gniadek |
| 2013/0094816 A1 | 4/2013 | Lin |
| 2013/0121653 A1 | 5/2013 | Shitama |
| 2013/0163934 A1* | 6/2013 | Lee ..................... G02B 6/3879 |
| | | 385/78 |
| 2013/0170797 A1 | 7/2013 | Ott |
| 2013/0183012 A1 | 7/2013 | Cabanne Lopez |
| 2013/0216185 A1 | 8/2013 | Klavuhn |
| 2013/0216188 A1 | 8/2013 | Lin |
| 2013/0259429 A1 | 10/2013 | Czosnowski |
| 2013/0308915 A1 | 11/2013 | Buff |
| 2013/0322825 A1 | 12/2013 | Cooke |
| 2014/0016901 A1 | 1/2014 | Lambourn |
| 2014/0023322 A1 | 1/2014 | Gniadek |
| 2014/0050446 A1 | 2/2014 | Chang |
| 2014/0056562 A1 | 2/2014 | Limbert |
| 2014/0133808 A1 | 5/2014 | Hill |
| 2014/0219621 A1 | 8/2014 | Barnette, Jr. |
| 2014/0226946 A1 | 8/2014 | Cooke |
| 2014/0241644 A1 | 8/2014 | Kang |
| 2014/0241678 A1 | 8/2014 | Bringuier |
| 2014/0241688 A1 | 8/2014 | Isenhour |
| 2014/0328559 A1 | 11/2014 | Kobayashi et al. |
| 2014/0334780 A1 | 11/2014 | Nguyen |
| 2014/0348477 A1 | 11/2014 | Chang |
| 2015/0003788 A1 | 1/2015 | Chen |
| 2015/0111417 A1 | 4/2015 | Vanderwoud |
| 2015/0212282 A1 | 7/2015 | Lin |
| 2015/0301294 A1 | 10/2015 | Chang |
| 2015/0331201 A1 | 11/2015 | Takano |
| 2015/0355417 A1 | 12/2015 | Takano |
| 2015/0370021 A1 | 12/2015 | Chan |
| 2015/0378113 A1 | 12/2015 | Good |
| 2016/0131849 A1 | 5/2016 | Takano |
| 2016/0172852 A1 | 6/2016 | Tamura |
| 2016/0178852 A1 | 6/2016 | Takano |
| 2016/0195682 A1 | 7/2016 | Takano |
| 2016/0259135 A1 | 9/2016 | Gniadek |
| 2016/0266326 A1 | 9/2016 | Gniadek |
| 2016/0291262 A1 | 10/2016 | Chang |
| 2016/0320572 A1 | 11/2016 | Gniadek |
| 2016/0322750 A1 | 11/2016 | Plamondon |
| 2016/0349458 A1 | 12/2016 | Murray |
| 2016/0370545 A1 | 12/2016 | Jiang |
| 2017/0003458 A1 | 1/2017 | Gniadek |
| 2017/0205587 A1 | 7/2017 | Chang |
| 2017/0205590 A1 | 7/2017 | Bailey |
| 2017/0205591 A1 | 7/2017 | Takano |
| 2017/0343740 A1 | 11/2017 | Nguyen |
| 2018/0156988 A1 | 6/2018 | Gniadek |
| 2018/0172923 A1 | 6/2018 | Bauco |
| 2018/0172942 A1* | 6/2018 | Bauco ..................... G02B 6/43 |
| 2018/0292612 A1 | 10/2018 | Chang et al. |
| 2019/0064447 A1* | 2/2019 | Chang .................. G02B 6/4292 |
| 2019/0086615 A1 | 3/2019 | Rosson et al. |

FOREIGN PATENT DOCUMENTS

| | | |
|---|---|---|
| CN | 201383588 Y | 1/2010 |
| CN | 202600189 U | 12/2012 |
| DE | 202006011910 U1 | 4/2007 |
| DE | 102006019335 A1 | 10/2007 |
| EP | 1074868 A1 | 2/2001 |
| EP | 1211537 A2 | 6/2002 |
| EP | 1245980 A2 | 10/2002 |
| EP | 1566674 A1 | 8/2005 |
| GB | 2111240 A | 6/1983 |
| JP | 2009229545 A | 10/2009 |
| JP | 2009276493 A | 11/2009 |
| WO | WO2001079904 A2 | 10/2001 |

(56) References Cited

FOREIGN PATENT DOCUMENTS

| WO | WO2004027485 A1 | 4/2004 |
|---|---|---|
| WO | WO2008112986 A1 | 9/2008 |
| WO | WO2009135787 A1 | 11/2009 |
| WO | WO2010024851 A2 | 3/2010 |
| WO | WO2012136702 A1 | 10/2012 |
| WO | WO2012162385 A1 | 11/2012 |
| WO | WO2014028527 A2 | 2/2014 |
| WO | WO2014182351 A1 | 11/2014 |
| WO | WO2015191024 A1 | 12/2015 |
| WO | WO2016148741 A1 | 9/2016 |

OTHER PUBLICATIONS

European Search Report and Written Opinion dated Feb. 19, 2015 for EP 14168005.
"Fiber Optic Connectors and Assemblies Catalog" 2009, Huber & Suhner Fiber Optics, Herisau, Switzerland, www.google.co.in/url?sa=t&source=web&cd=63&ved=0CCMQFjACODw&url=http%3A%2-F%2Fwww.hubersuhner.com%2Fwrite_rtn_binary.pdf%3Fbinaryid%3D8DBC7DE2EB72D3-15%26binarytype%3D484DAA363AEB7E&ei=ZvcvTujWH4ntrAfH-dXZCg&usg=AFQjCNE1MdC—4avewRJU6IDVc_WYbr0QQ.
"Fiber Optic Interconnect Solutions, Tactical Fiber Optic Connectors, Cables and Termini" 2006, Glenair, Inc., Glendale, California, www.mps-electronics.de/fileadmin/files/MPS-E/Produkte/Katalog/Glenair/Kat- alog Glenair LWL-1110.pdf.
"Fiber Optic Products Catalog" Nov. 2007, Tyco Electronics Corporation, Harrisburg, Pennsylvania, www.ampnetconnect.com/documents/Fiber%20Optics%20Catalog%201107.pdf.
International Search Report and Written Opinion dated Apr. 27, 2012 for PCT/US2011/058799.
International Search Report and Written Opinion dated Aug. 27, 2012 for PCT/US2012/039126.
International Search Report and Written Opinion dated Jan. 16, 2014 for PCT/US2013/54784.
International Search Report and Written Opinion dated Aug. 29, 2014 for PCT/US2014/041500.
International Search Report and Written Opinion dated May 14, 2014 for PCT/US2014/012137.
International Search Report and Written Opinion dated Aug. 21, 2008 for PCT/US2008/057023.
International Preliminary Report on Patentability dated Sep. 14, 2017 from related International Application No. PCT/US2015/059458, International Filing Date Nov. 6, 2015.
International Search Report (ISR) WO2008112986 dated Sep. 15, 2009.
ISR WO2012162385ISR dated Nov. 29, 2012.
ISR WO2014028527ISR dated Jul. 16, 2015.
ISR WO2015191024ISR dated Oct. 9, 2014.
ISR WO2015US57610ISR dated Sep. 22, 2016.
ISR WO2016176083ISR dated May 19, 2016.
ISR WO2016148741ISR dated Sep. 22, 2016.
Non-Final Office action for U.S. Appl. No. 15/847,875, dated Jun. 1, 2018, 9 pages.
Fiber Optic Connectors Tutorial, 2018, 20 pages.
Fiber Optic Glossary, Feb. 29, 2016, 93 pages.
PCT/IB2018/056133 Written Opinion Jan. 3, 2019.
PCT/IB/056133 Search Report Jan. 3, 2019.
International Search Report and Written Opinion for PCT Application No. PCT/US2020/033491, dated Oct. 16, 2020.

* cited by examiner

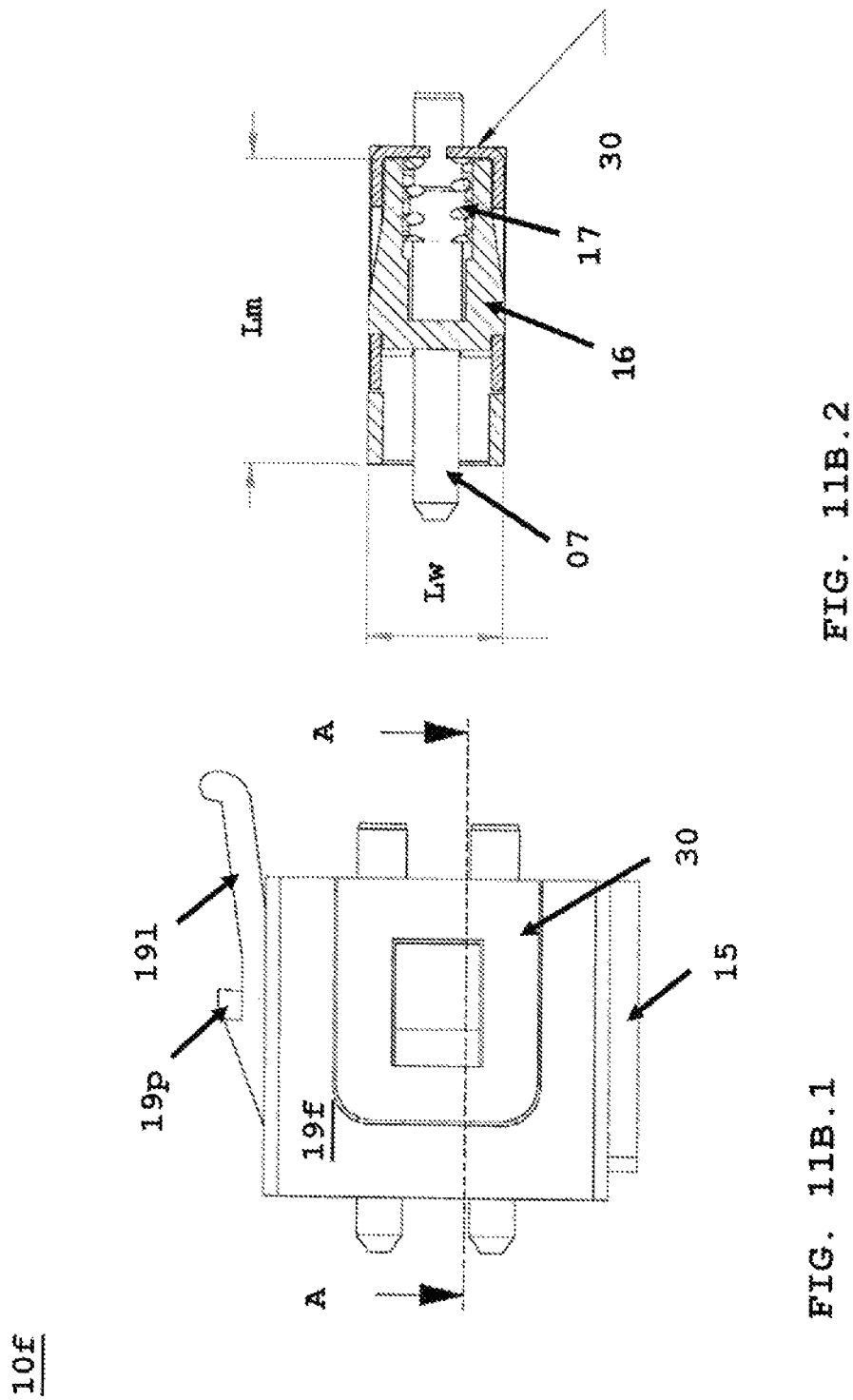

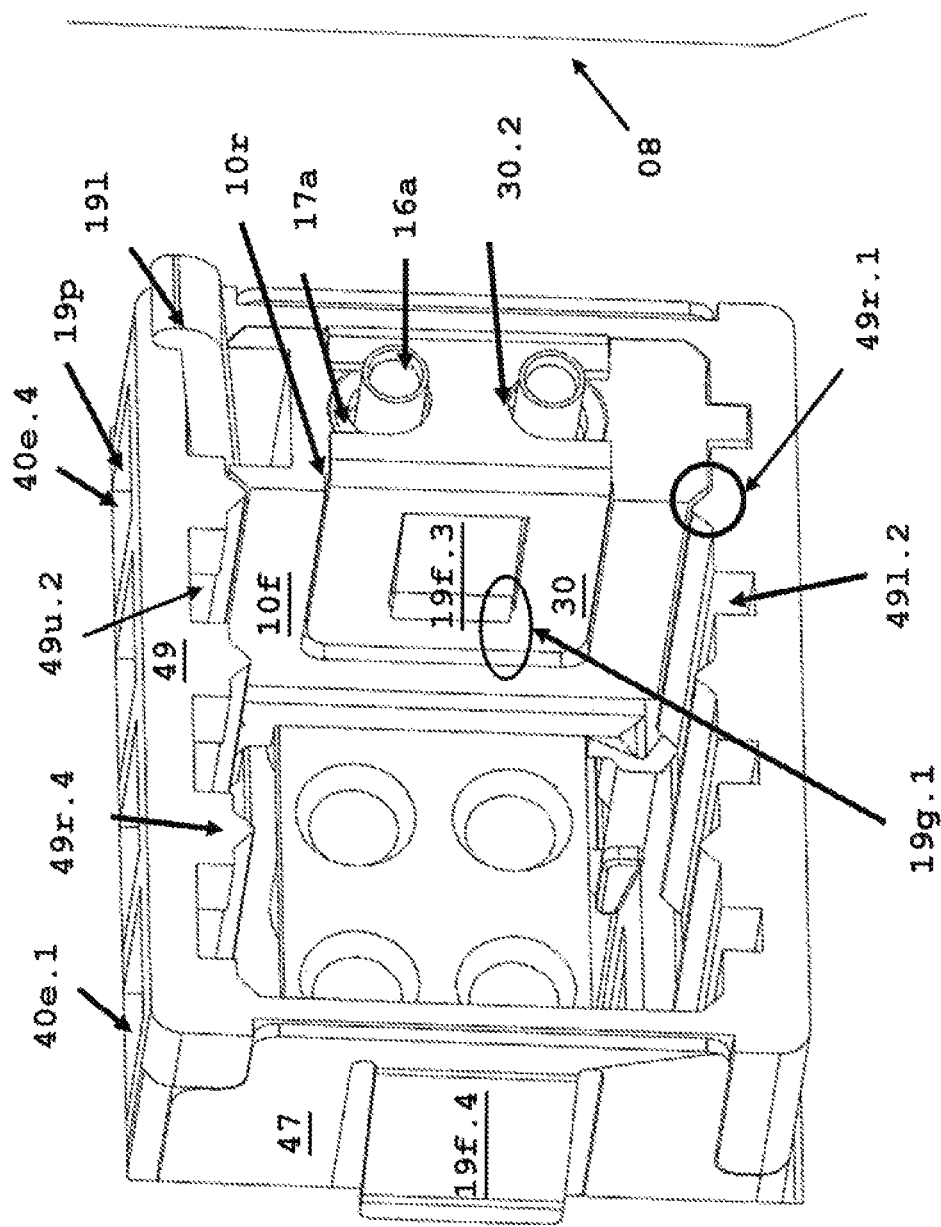

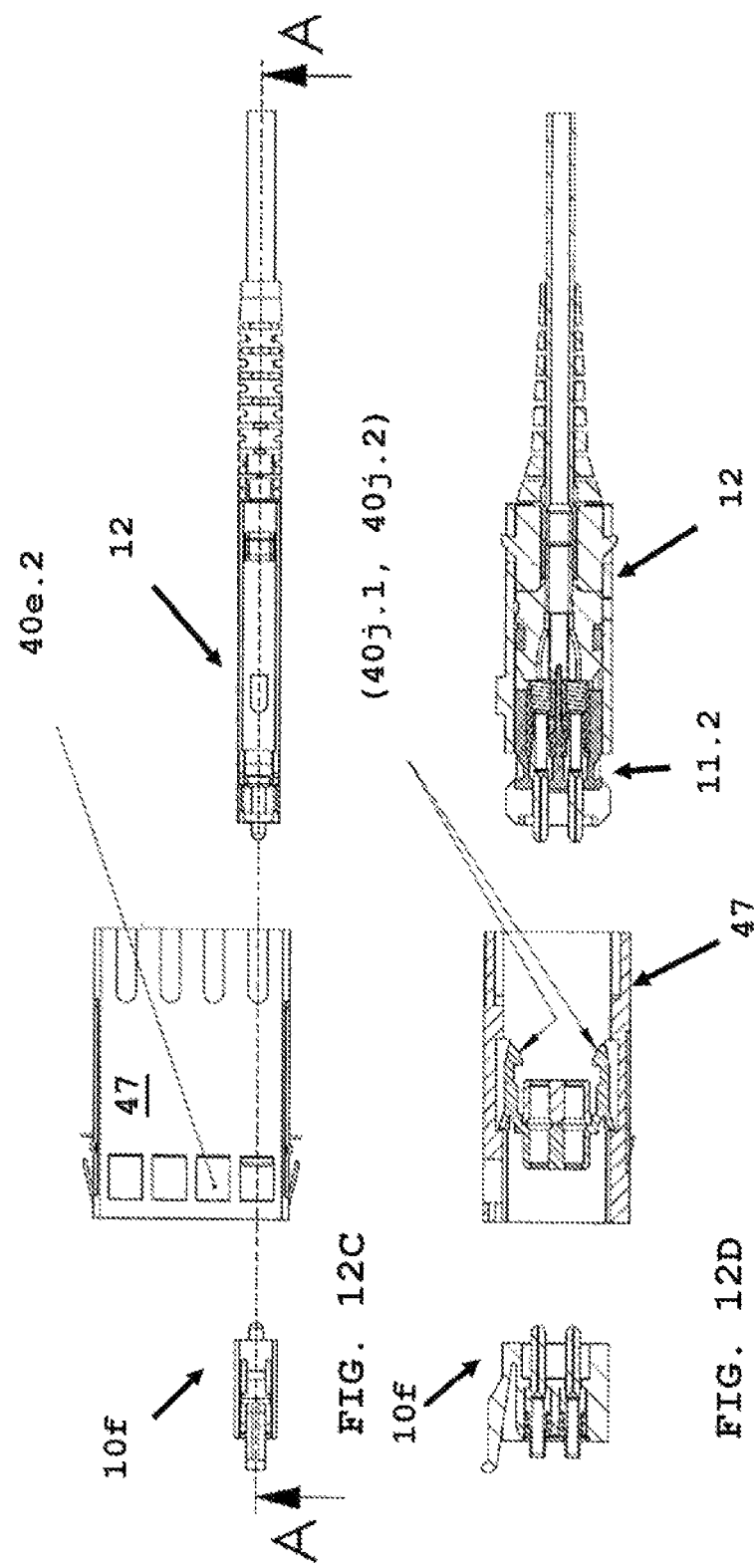

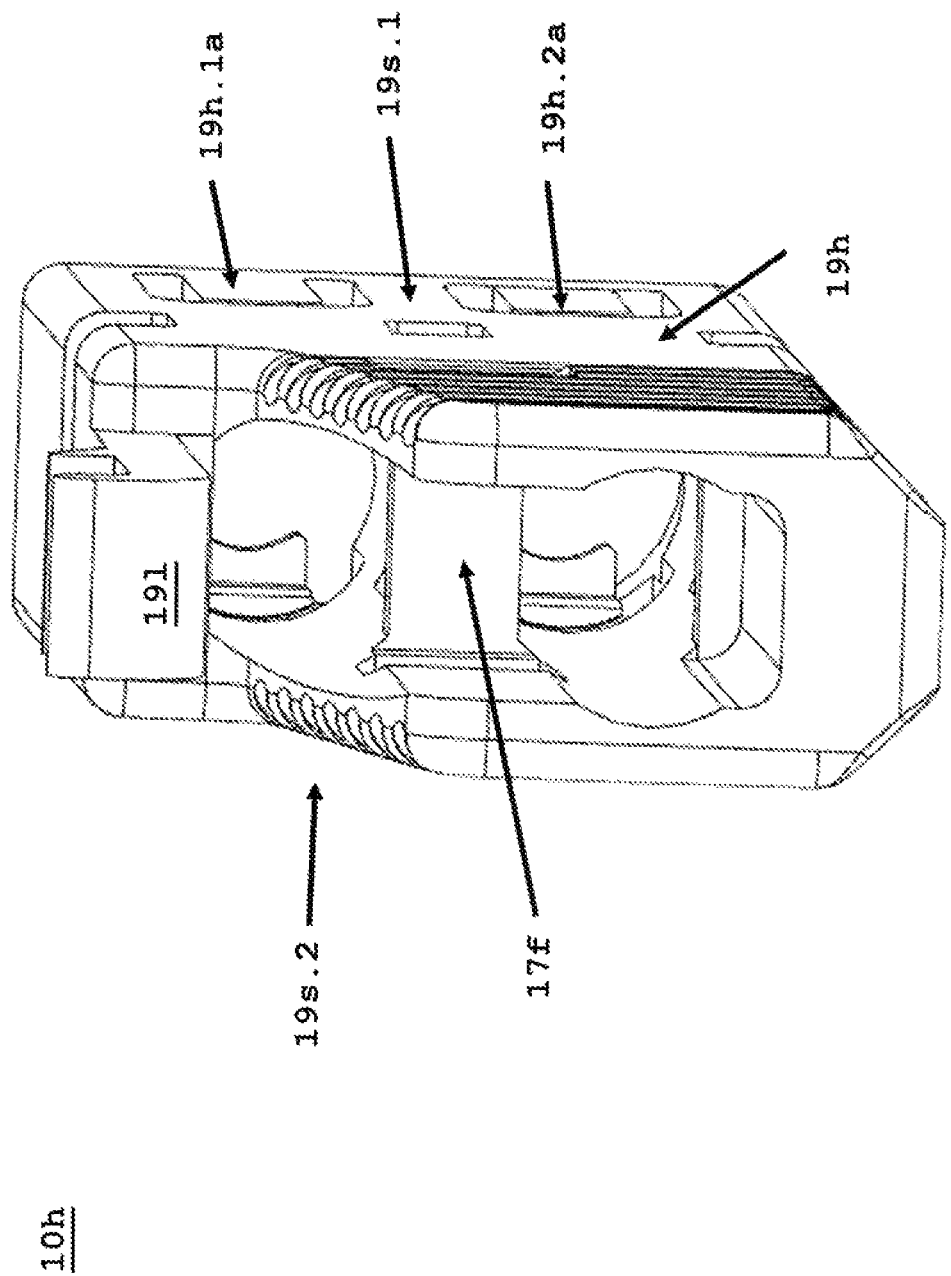

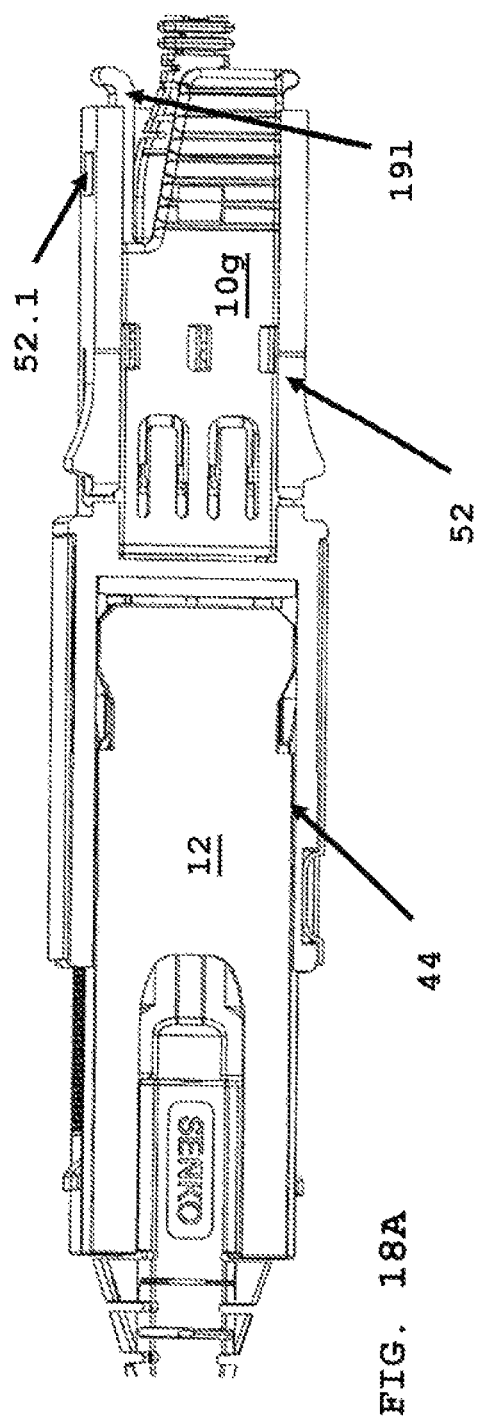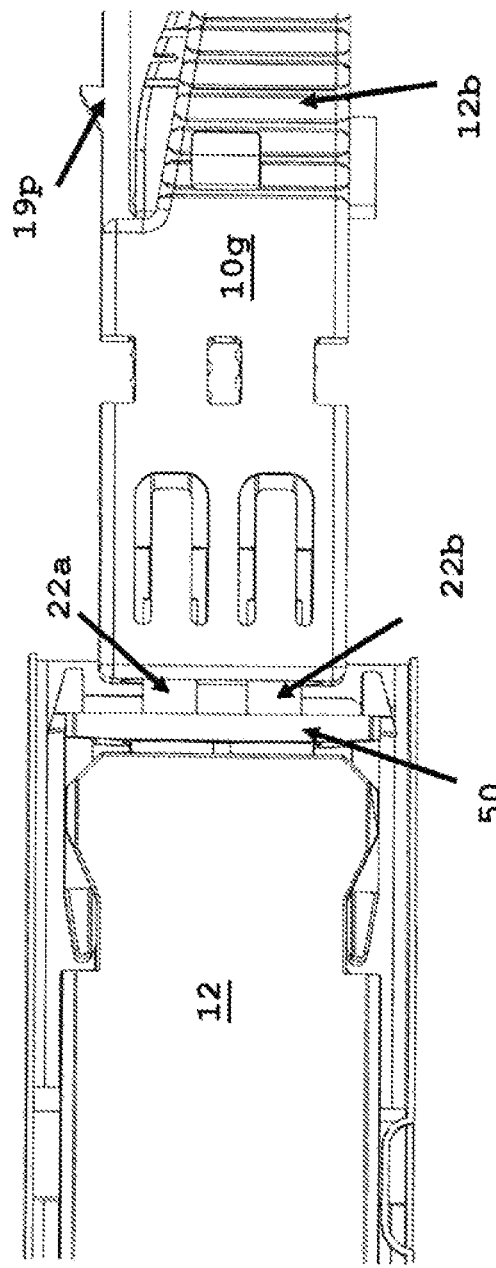

BEHIND-THE-WALL OPTICAL CONNECTOR AND ASSEMBLY OF THE SAME

RELATED APPLICATIONS

This case is a continuation-in-part of Ser. No. 16/835,277 filed on Mar. 30, 2020, which claims priority to U.S. Provisional Application 62/825,778 filed on Mar. 28, 2019, and the present application claims priority to U.S. Provisional Application 62/849,045 filed on May 16, 2019 and this application further claims priority to U.S. Provisional Application 62/864,284 filed on Jun. 20, 2019, all of the above are incorporated herein by reference.

BACKGROUND

In the present disclosure, the field of invention relates generally to fiber optic connectors with and without a release structure to disengage the connector from the adapter. More specifically, the present disclosure relates to reduce housing connectors with limited outer housing length and width to allow a closer packing of connectors used within narrow or reduce spaces, such as a panel of connectors near a wall or back-to-back with another panel.

The prevalence of the Internet has led to unprecedented growth in communication networks. Consumer demand for service and increased competition has caused network providers to continuously find ways to improve quality of service while reducing cost. Certain solutions have included deployment of high-density interconnect panels. High-density interconnect panels may be designed to consolidate the increasing volume of interconnections necessary to support the fast-growing networks into a compacted form factor, thereby increasing quality of service and decreasing costs such as floor space. However, the deployment of high-density interconnect panels is still advancing. In communication networks, such as data centers and switching networks, numerous interconnections between mating connectors may be compacted into high-density panels. Panel and connector producers can be optimized for such high densities by shrinking the connector size and/or the spacing between adjacent connectors on the panel. Thus, generally, more connectors are used in a high density array. As the numbers of connectors in a switching network increases, the associated cost of creating the switching network similarly increases. Generally, the construction of connectors includes the use of various components. The manufacturing process used to make these connectors and the components used to build them can greatly affect their cost per unit. With high density switching networks and large data centers using thousands of these connectors, the cost per unit has an impact on the overall cost of designing and implementing a data center. Thus, if a new lower cost connector (e.g., a lower cost behind-the-wall (BTW) connector) could be developed, and this would improve on connector density within a data center.

SUMMARY OF INVENTION

The present invention is directed to low-profile, reduced sized connector used in fiber optic networks. The present invention connectors disclosed are inserted into an adapter or transceiver receptacle to mate with an opposing fiber optic connector of the same type, a different configuration, or transceiver electronics that convert the light signal over the fiber optic into an electrical signal, or vice versa.

The behind-the-wall connector has an outer housing shaped to be received in an adapter opening similarly configured to help align the connector before the connector is secured in the adapter port. The connector has an external adapter release latch with a recess and a protrusion that secures the connector in the adapter via an opening in the adapter housing. The connector release is integrated at a first end of the connector housing, and extends beyond a second end. The second end of the release latches into the adapter opening. The adapter release may be oriented 180 from the second end to the first end. The connector may use a securing latch within the adapter receptacle or port opening where pulling on the connector boot releases the connector from the adapter port.

In another embodiment, the behind-the-wall connector outer housing has a widthwise recess at the front of the housing. A latch hook is secured within an adapter port that upon inserting the connector into the port, the latch resides in the connector recess thereby securing the connector within the adapter. A reduced profile backbody is secured with a substantially open front body that accepts the backbody, and the latter secures a ferrule assembly and bias springs within the connector housing forming a BTW connector.

In another embodiment, the connector housing has an opening on two sides. The opening accepts a protrusion on opposing side of an integrated backbody. The integrated backbody has a pair of adapter latch hooks on an opposite side of the connector housing, the latch hooks are configured to accept a two ferrule LC type data center fiber optic connector such as the SN® connector sold by the assignee of the present invention. Here the integrated backbody reduces components needed within the adapter to hold the opposing fiber optic connector. The assembly of the behind-the-wall connector occurs from the front with the integrated backbody securing the ferrule assembly, alignment sleeves and bias springs within the connector housing forming a behind-the-wall fiber optic connector according to an embodiment of the present invention.

In another embodiment, an adapter release latch is positioned on a top side or a bottom side of the connector outer housing. The release latch extends along the side of the connector housing with a chamfer at the leading end of the latch. The leading end enters the adapter port with the chamfer helping to prevent binding of the connector within the port.

In another embodiment of the behind-the-wall connector, the connector deploys an adapter latch integrated with the connector housing nearer a proximal end of the outer housing, and with a chamfer on the leading edge of the latch. The latch has a recess behind the chamfer to accept securing structure, such as a protrusion or raised surface within the adapter port.

In another embodiment of the behind-the-wall connector embodiment, the latch is positioned at a distal or opposite the leading edge of the connector housing. The latch chamfer engages adapter structure that secures the connector via a recess within the connector latch. A second integrated backbody replaces the alignment sleeves with a ferrule assembly support.

The present invention further discloses a reduced profile adapter configured to accept the SN® fiber optic connector at a first end and a behind-the-wall connector at a second end. In another embodiment, an integrated connector latch assembly further comprises an alignment sleeve at a second end. The integrated connector latch assembly and the alignment sleeve further comprises opposing connector latch hooks. The connector latch assembly is secured within the adapter housing.

The advantage to having a behind-the-wall connector is that smaller and smaller adapter cassettes and/or transceiver devices, the space between cassettes is more and more limited and between connectors the space is reduced. These components use non-reinforced fiber cables such as 900 micron or bare fiber. No protection strain relief such as boots are used to help reduce overall length but at the expense of increase damage to the optical fiber. The typical spring loaded "push in" to connect and "pull out" is used to connector and disconnect optical connectors from an adapter port. A connector has some type of spring retainer (or back-post) that is pushed into an inner cavity of the connector body. The spring retainer, when it has been inserted to a desired depth, becomes latched within the connector body when a protrusion on the outer surface of the spring retainer enters a corresponding hole, opening or recess in the side(s) of the connector body. This latching method requires additional length of the connector body behind the latching location(s) not needed when using the outer housing of the present invention. As a way to minimize the overall length of a behind-the-wall connector, a spring retainer or clip is designed to fit externally onto the connector body, spanning across the rear end of the connector body in such a way as to retain the springs and ferrule assembly biased by the springs within the outer housing of the BTW connector. This assembly reduces the outer housing or connector body length to a minimum overall length. The outer housing sidewalls can be recessed to accept the thin cross section of the spring retainer so as to not increase the width of the connector. The recesses are conveniently shaped so as to also create a raised latching edge for the spring retainer on both sides of the connector body, instead of providing latch hooks formed as part of the outer housing to hold the spring retainer clip, as discussed below. Additional features and advantages of the invention will be set forth in the detailed description below, and in part apparent to those skilled in the art of the invention. It is understood that foregoing summary, drawings and detailed description are intended to provide a framework or overview for understanding the scope of the invention claimed.

BRIEF DESCRIPTION OF THE DRAWINGS

FIG. 11B.1 is a side view of the FIG. 11A assembled;

FIG. 11B.2 is a cross-section view along line A-A of FIG. 11B.1;

FIG. 12A is the connector of FIG. 11 secured within an adapter port;

FIG. 12C is a top perspective view of FIG. 12B;

FIG. 12D is cross-section view along section line A-A of FIG. 12C;

FIG. 17 is a distal view of FIG. 14;

FIG. 18A is a cross-section view of a connector according to the invention opposing a prior art connector;

FIG. 18B is depicts a connector according to the present invention secured within a behind-the-wall connector latch assembly.

Corresponding reference numbers indicate corresponding parts throughout the figures.

DETAILED DESCRIPTION

Figure 1:
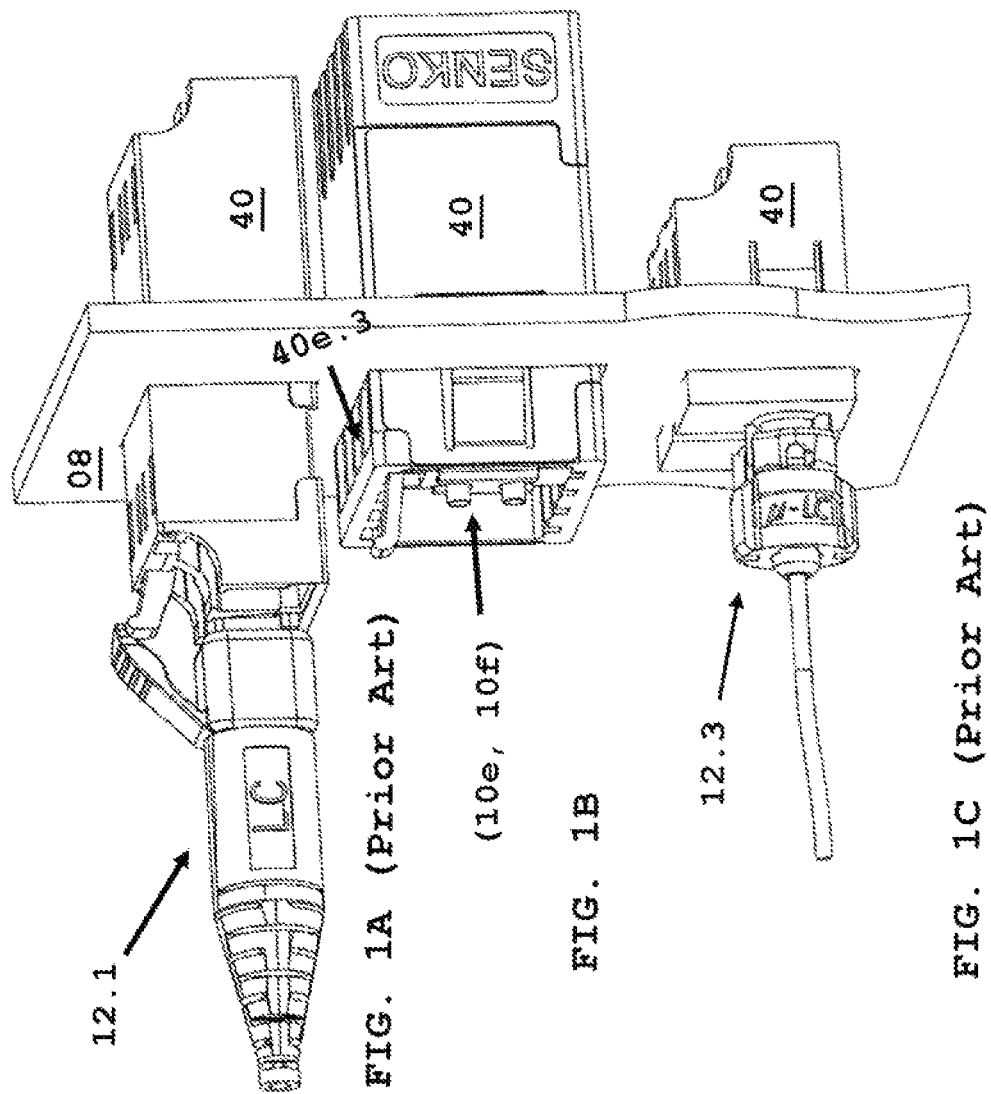
FIG. 1A is a perspective view of a first prior art fiber optic connector secured within an adapter as part of a panel system.
FIG. 1B is a perspective view of a behind-the-wall connector according to the embodiments disclosed secured within an adapter as part of a panel system.
FIG. 1C a perspective view of a second prior art fiber optic connector secured within an adapter as part of a panel system.

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The following terms shall have, for the purposes of this application, the respective meanings set forth below.

A "connector," as used herein, refers to a device and/or components thereof that connects a first module or cable to a second module or cable. The connector may be configured for fiber optic transmission or electrical signal transmission. The connector may be any suitable type now known or later developed, such as, for example, a ferrule connector (FC), a fiber distributed data interface (FDDI) connector, an LC connector, a mechanical transfer (MT) connector, a square connector (SC) connector, an SC duplex connector, a straight tip (ST) connector, or a behind-the-wall (BTW) connector. The connector may generally be defined by a connector housing body. In some embodiments, the housing body may incorporate any or all of the components described herein.

A "fiber optic cable" or an "optical cable" refers to a cable containing one or more optical fibers for conducting optical signals in beams of light. The optical fibers can be constructed from any suitable transparent material, including glass, fiberglass, and plastic. The cable can include a jacket or sheathing material surrounding the optical fibers. In addition, the cable can be connected to a connector on one end or on both ends of the cable.

Behind-the-wall connectors are important in today's high density data centers. The behind-the-wall connector is considered a small form factor or small footprint connector, that is, where its overall length is reduced, compared, for example, FIG. 1A and FIG. 1C. The size decrease is measured from the ferrule or distal end to the end of the boot or proximal end of the connector to a distal end of the outer housing. In this invention, behind-the-wall literally means the connector is placed behind a wall or panel, and the panels are stored in the rack that extend from the floor to the ceiling, and the multiple racks of panels, each containing numerous adapters, are positioned near another rack with little or no distance between the racks. As such, the removal of connector structure is needed to allow the racks to be placed very close together, without degrading the reliability of the connector.

Behind-the-wall connectors can be used within miniaturized cassettes or transceivers. A behind-the-all connector uses a non-reinforced optical fiber, such as a 900 nm coated optical fiber. Without the cable jacket or strain relief boot, the optical fiber can break or damage easily. Prior art data center connectors deploy a "push-in" or "pull-out" structure to connect and disconnect optical connectors from an adapter port, the data center connectors have a spring retainer (backbody or backpost) that is secured within an inner cavity of the connector housing. The spring retainer is configured to be retained within the connector housing and the retained is latched within the connector housing. This latching mechanism requires additional length and width added to the connector housing. To reduce the connector overall length a spring retainer is configured to be externally fitted onto a cut-out formed as a part of the sidewall of the outer connector housing, and the spring retainer or clip forms the outer housing of the connector. Alternatively, the connector outer housing body maybe recesses slightly to accept the clip. The recesses are raised to form a raised latching edit for the clip on opposing sidewalls of the connector outer housing.

Figure 10:
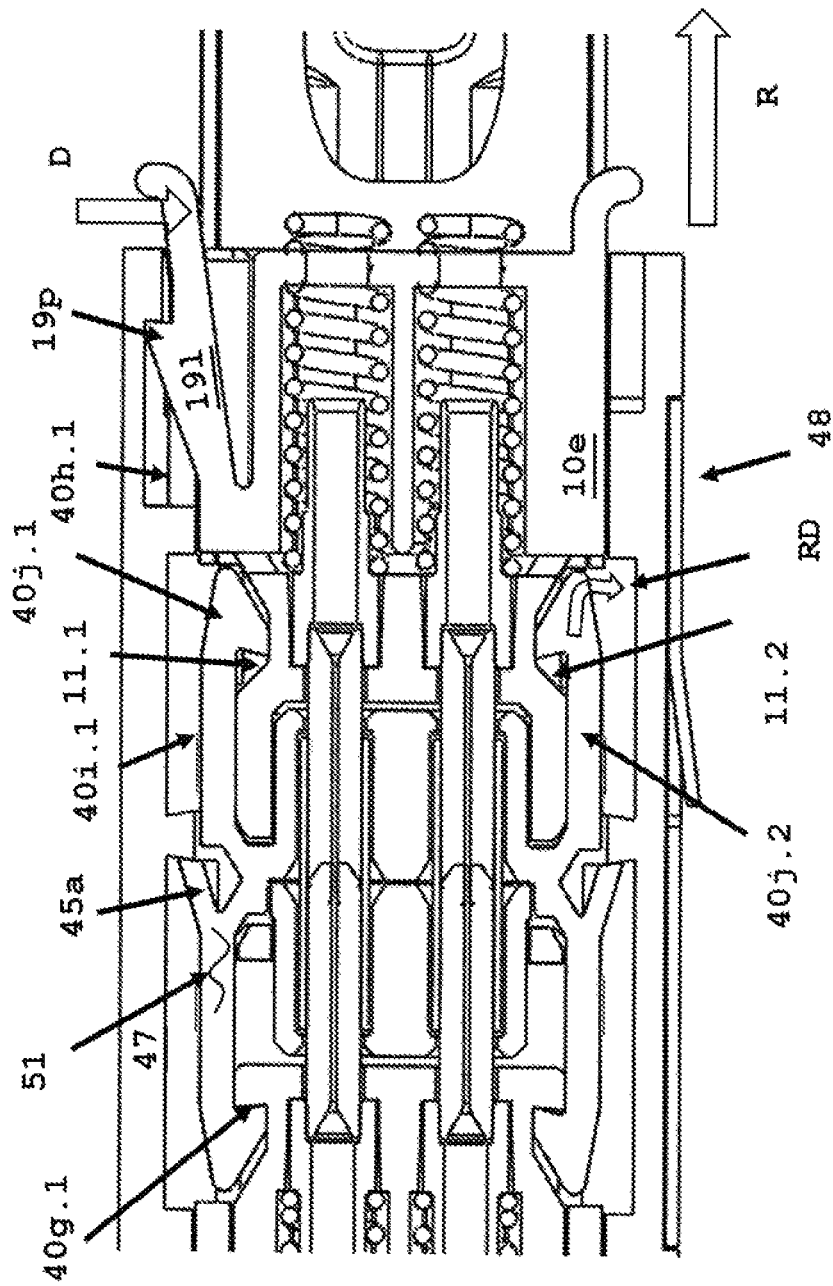
FIG. 10 is a cross-section view along line A-A of FIG. 9.

FIG. 1A depicts a prior art data center fiber optic connector (12.1) inserted into a port of a prior art adapter (40). The adapter is secured to panel (08). FIG. 1B depicts a behind-the-wall fiber optic connector, as disclosed within the present invention. This connector is secured within a port of a reduced length adapter having one or more latch recesses (40e.1-40e.4) formed on a first side of the adapter housing (47) and a second, opposing recess is formed on a second side of the adapter housing to accept a pair of opposing latches formed on a backbody or outer housing of the BTW connector, such as described in FIG. 8 below. FIG. 10 depicts a bayonet fiber optic connector (12.3) secured to the panel (08). A data center connector (12.3) used in this invention is disclosed in U.S. Pat. No. 10,281,668, Ultra-Small Form Factor Optical Connectors, Inventor Takano, granted May 7, 2019, and currently owned by the assignee of this invention. This granted patent is fully incorporated by reference into this application. A bayonet fiber optic connector used in this invention is disclosed in U.S. Pat. No. 10,295,753 B2, Fiber Optic Hybrid Adapter and Connector Assemblies, Inventor Takano, granted May 21, 2019, which is incorporated by reference into this application and currently owned by the assignee of this application. A prior art behind-the-wall connector with a reverse latch on one-side of the connector housing is disclosed in U.S. Pat. No. 10,359,583 B2, Behind the Wall Optical Connector with Reduced Components, Inventor Chang, granted Jul. 23, 2019, which is incorporated by reference into this application and currently owned by the assignee of this invention.

Figure 2:
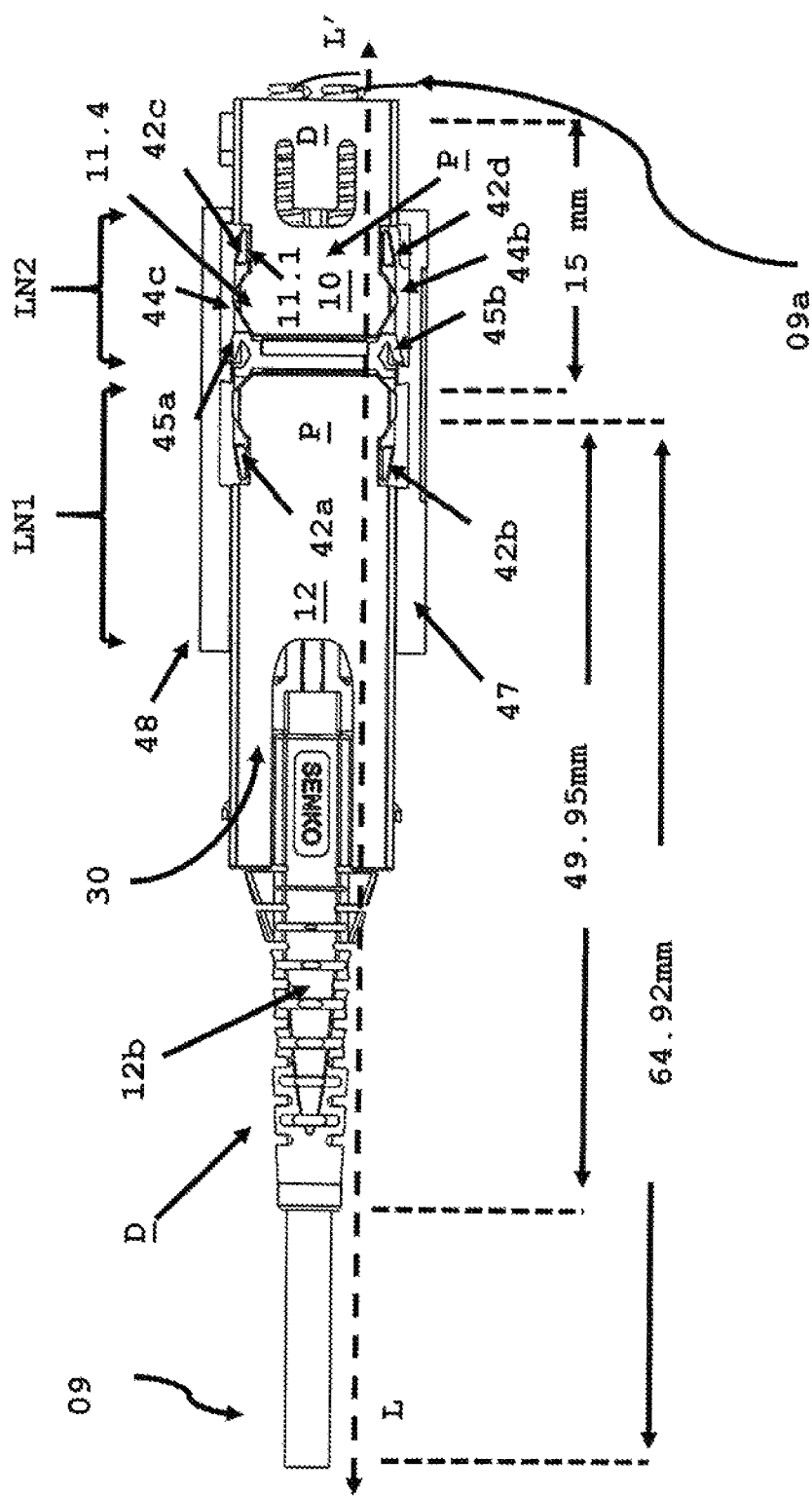
FIG. 2 is a cross-section view of a prior art adapter with a prior art fiber optic connector opposing a behind-the-wall fiber optic connector according to the present invention.

FIG. 2 is a cross-section view of a prior art data center connector (12.1) and an opposing behind-the-wall (BTW) connector (10) inserted into an opposing port of a reduced length adapter (48) along an optical axis (L-L'). Adapter hook assembly is secured within an inner housing structure of the adapter housing (47) by hook (45a, 45b) within recess or cut-out within adapter. Connector (10) is inserted into a port, and adapter latch (42c) is displaced by a chamfer or similar structure on the connector. Hook or latch (42c) is displaced into recess (11.1). Because hook (42c) is resilient, when connector (10) is seated within the alignment sleeve bore (not shown), the adapter latch (42c, 42d) returns to its normal position and comes to rest with a widthwise cut-outs (11.1, 11.2) (FIG. 3) along a top surface of the outer housing of the connector (10) near a proximal end of the connector. Latches (42a, 42b, 42c, 42d) are displaced into a corresponding recess (44b) for latch (42d). This works similarly to what is described above. Connector (10) is inserted into the adapter port, and when fully inserted adapter hooks (42c, 42d) latch the connector by residing in opposing widthwise recesses (11.1, 11.2). Connector (10) has raised surfaces (11.4) (FIG. 3) that are received in recesses (44b, 44c) to help secure the connector (10) within an adapter port. The proximal end (P) is defined by the location of the optical ferrules and optical fiber (09a) along the optical axis or longitudinal axis (L-L'). The overall length of opposing connectors is reduced by over 45 mm when a BTW connector opposes a data center connector, as depicted in FIG. 2. The length of connector (12.1) with an optical cable (09) is about 65 mm. The length of connector (12.1) with the cable boot (12b) is about 50 mm. Additional, the prior art adapter is reduced from 2 times LN1 (34.5 mm) to LN1+LN2 (7 mm) by about 28 mm. The BTW connectors, as described in this application, do not require additional adapter structure or outer housing length to hold the BTW connector within a port. As described in FIG. 1A to FIG. 1C above a panel holds the adapter, using a panel latch located on the outer housing of the adapter.

FIG. 3 to FIG. 7 depict behind-the-wall connectors when deployed in a reduced length adapter that are configured to reduce the overall length of opposing connector and adapter assembly by about 10 mm to about 28 mm depending on the behind-the-wall connector used opposite a data center fiber optic connector. A pair of BTW connectors can be deployed along the optical axis of an adapter thereby opposing each other and reducing the overall length of the connector and adapter system to about 32 mm. The length reduction of the BTW is accomplished by replacing the connector outer housing and/or removing cable boot (12b), and replacing with an improved outer housing, an inner body (14), backbody (24), wherein the inner body is formed as an integrated inner body or a two-piece inner body. Backbody (24) has opposing latch arms with a leading edge chamfer (24.1) to help prevent binding upon assembly in direction of arrow (A). The behind-the-wall connector is assembled with a set of ferrule assembly (16a, 16b), bias springs (17a, 17b) and a pair of alignment sleeve holder openings (20a, 20b) that accept a proximal end of the ferrule. The alignment sleeve holder openings receive the ferrule protruding from the proximal end of the ferrule assembly. In some embodiments, the outer housing has an external latch that cooperates with an adapter latch recess, as depicted in FIG. 5 thru FIG. 8.

Figure 3:
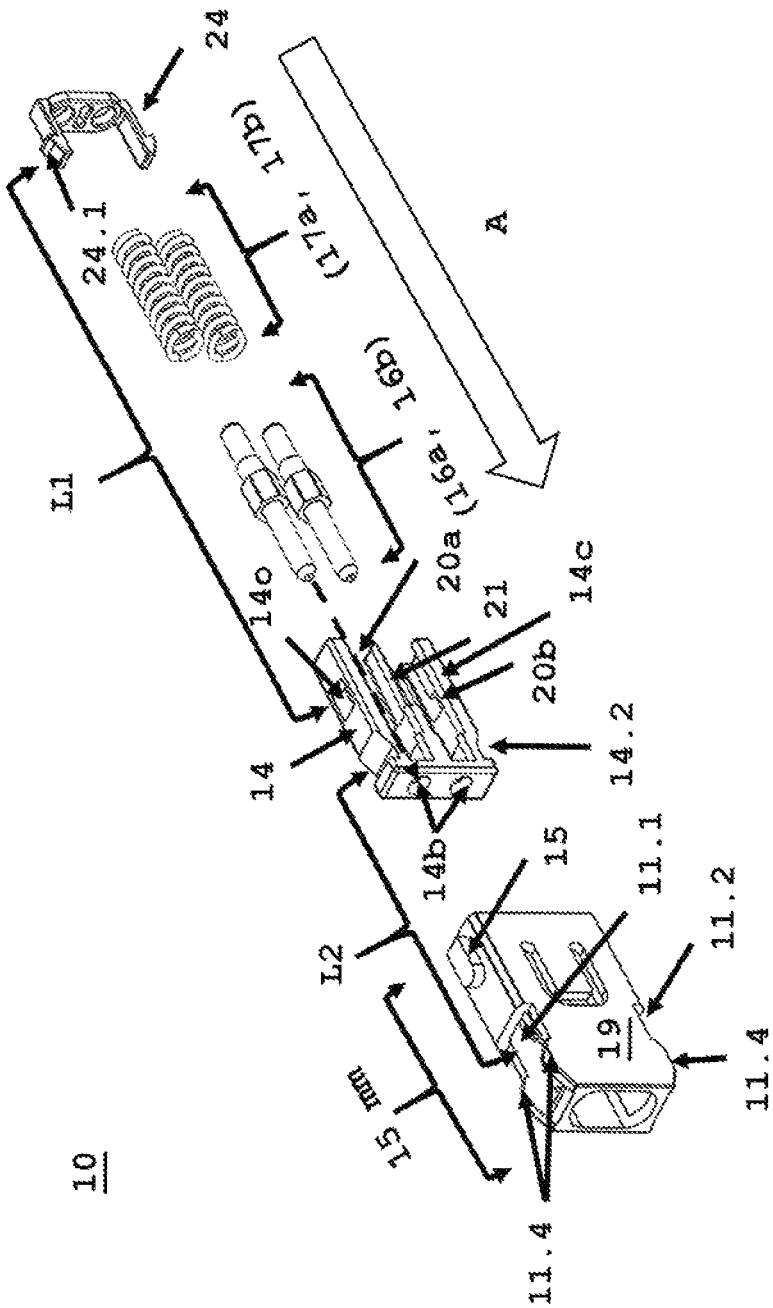
FIG. 3 is an exploded view of a behind-the-wall connector according to an of embodiment of the present invention.

FIG. 3 depicts an exploded view of behind-the-wall fiber optic connector (10) inserted into an opposing adapter port to a data center connector (12, 12.1). Connector (10) comprises an outer housing (19) with opposing cut-outs (11.1, 11.2) at the proximal end of the outer housing (19). Outer housing (19) is about 15 mm. The outer housing (19) further comprises an alignment key (15) that orients connector (10) within a port of adapter (40). Inner body (14) accepts backbody (24) along latch line (L1) when hook (24.1) is secured within opening (14o) formed within each outer wall (14c) of inner body. Inner body (14) is secured within outer housing (19) when recess cut-outs (14.1, 14.2) are received in opposing body cut-outs (11.1. 11.2) along latch line (L2). When fitted together in direction of arrow (A), behind-the-wall connector (10) is assembled. In this embodiment, the alignment sleeve holder openings (20a, 20b) have no sidewalls. Shelf (21) extends from a proximal end of the inner body and accepts the ferrule assembly up to proximal end of the ferrule flange. When the ferrule assembly (16a, 16b) is fully inserted with inner body (14), the ferrule protrudes through an opening (14b) (as shown by the dashed arrow), of the inner body which is the alignment sleeve holder opening. In this configuration, the inner front body having open sidewalls with a shelf (21) allows for the removal of the ferrule assembly (16a, 16b). The two opposing open sidewalls of the inner body and shelf forms the alignment sleeve holder. A pair of opposing chamfered, raised surfaces (11.4) are received in a recess (44c) within the adapter port to help secure the BTW connector therein.

Figure 4:
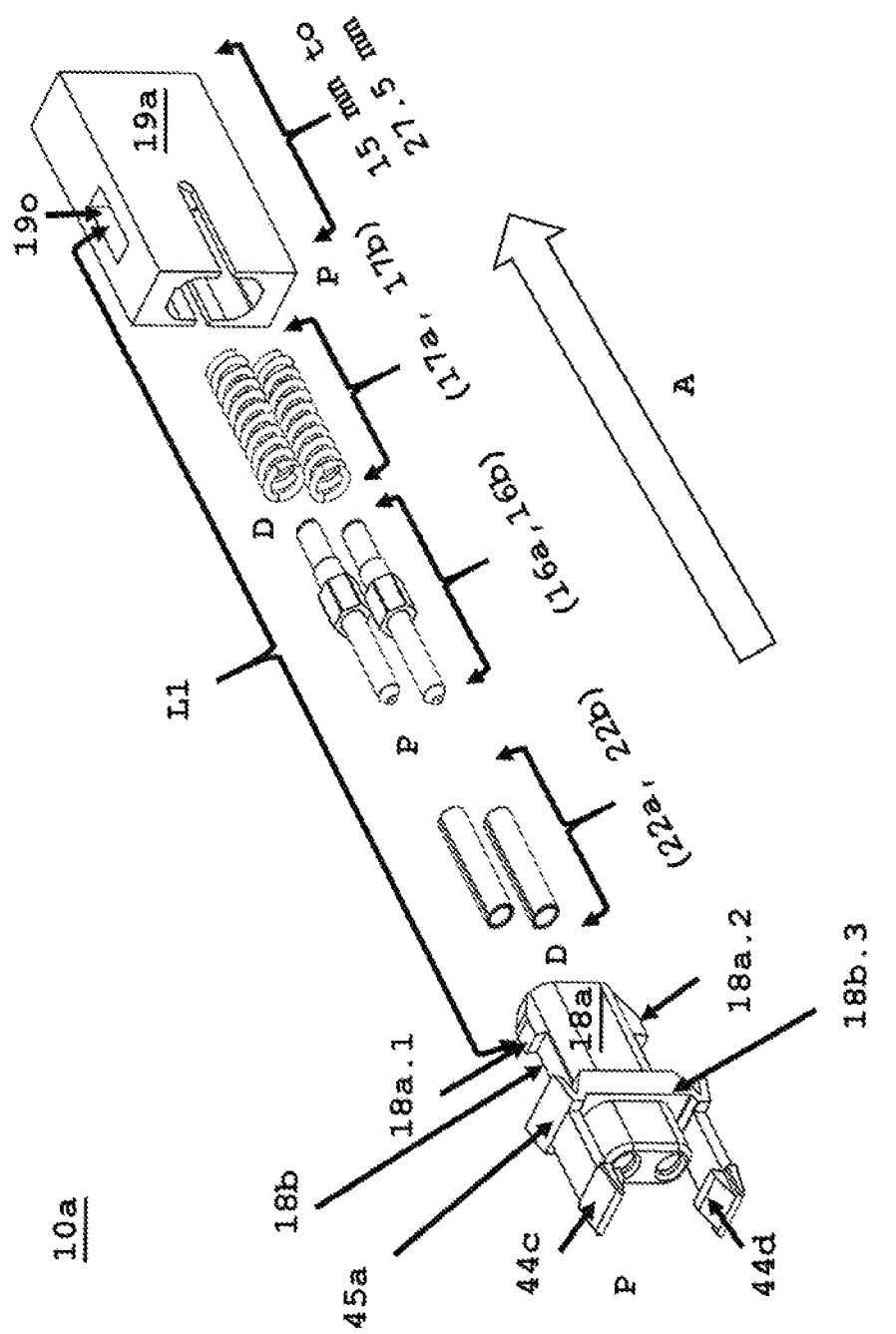
FIG. 4 is an exploded view of a behind-the-wall connector according to an of embodiment of the present invention.

FIG. 4 depicts another embodiment of behind-the-wall connector (10a). This is a one-piece design after assembly. Connector (10a) deploys an integrated inner body (18a). Inner body (18a) comprises a pair of opposing latch recess (44c, 44d) at a proximal end (P) of the assembled connector (10a) that are received within a port the adapter. A pair of latch recess (44c, 44d) are configured to receive a data center connector (12.1) in optical communication with the BTW connector. Inner body (18a) further comprise a flange (18b.3) with an upper hook (45a) and a lower hook, the pair of hooks are received in a cut-out or recess within the adapter port. The distal end (D) of the inner body has opposing protrusions or hook (18a.1, 18a.2), received in opening (19o) formed on opposing sides of outer housing (19a). Outer housing (19a) is about 15 mm in length but can be up to 27.5 mm in length depending on deployment. When assembled in direction of arrow (A), integrated inner body (18a) accepts alignment sleeves (22a, 22b) at the distal end of the inner body (18a). The alignment sleeves (22a, 22b) accept a corresponding ferrule at a proximal end (P) of each ferrule assembly (16a, 16b), and a pair of bias springs (17a, 17b) are received at a distal end (D) of the ferrule assembly (16a, 16b) and bias each ferrule assembly forward. The adapter hook (18a.1, 18a.2) is integrated or formed as part of the inner body (18a). In this embodiment, alignment sleeves (22a, 22b) are inserted into openings at a distal end of inner body (18a), which acts as an alignment sleeve holder. The alignment sleeve holder openings are at the proximal end (P) of the alignment sleeves.

Figure 5:
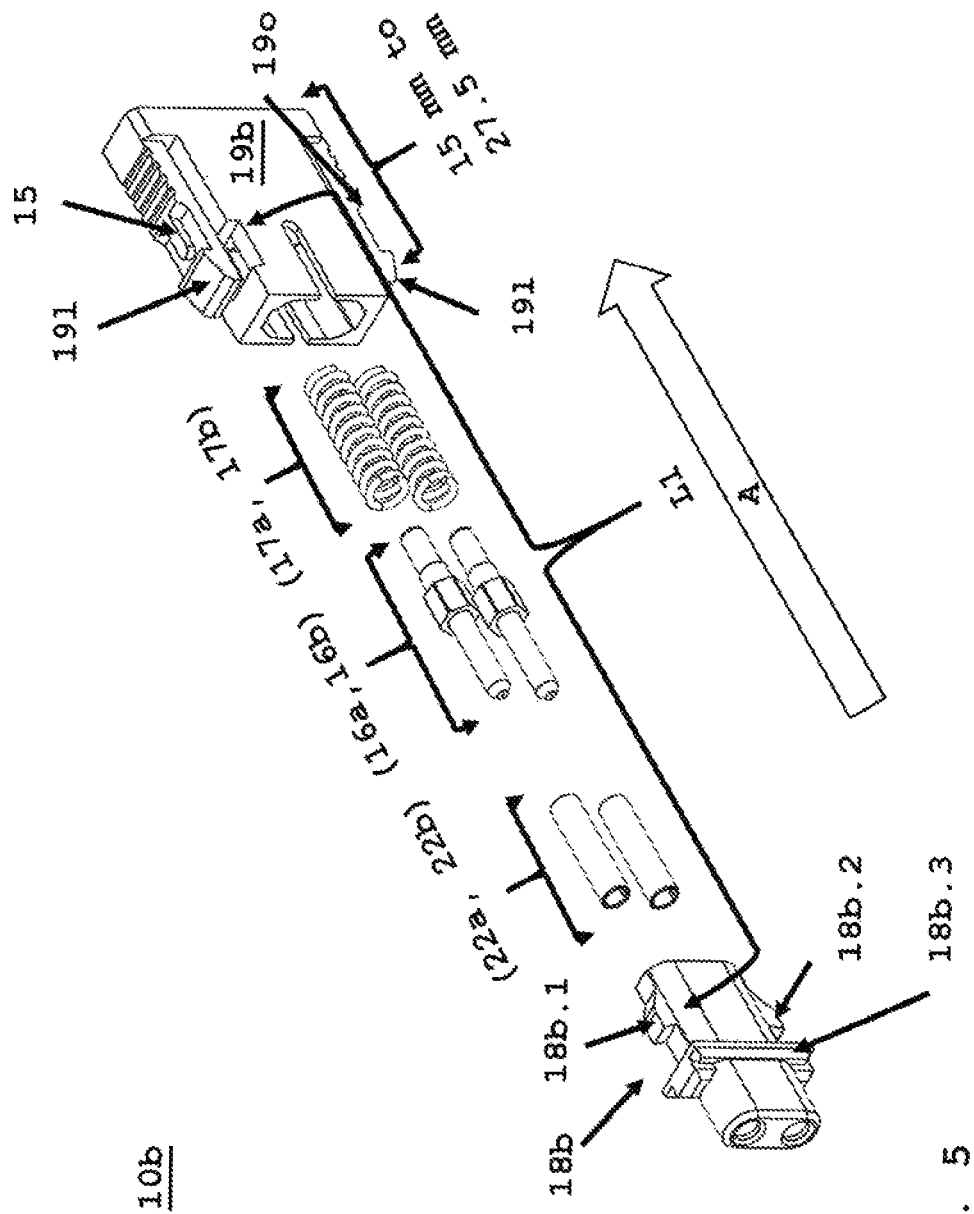
FIG. 5 is an exploded view of a behind-the-wall connector according to an of embodiment of the present invention.
Figure 6:
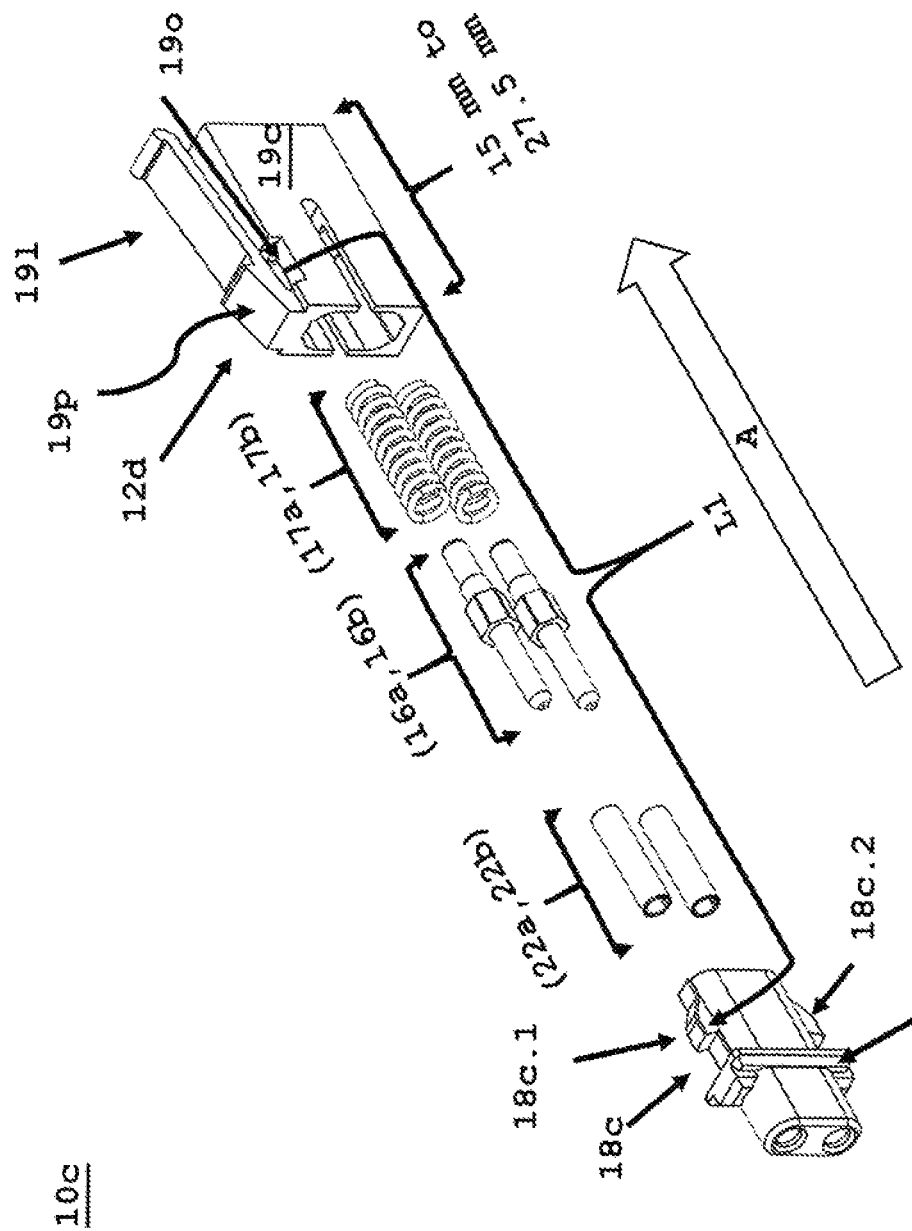
FIG. 6 is an exploded view of a behind-the-wall connector according to an of embodiment of the present invention.
Figure 7:
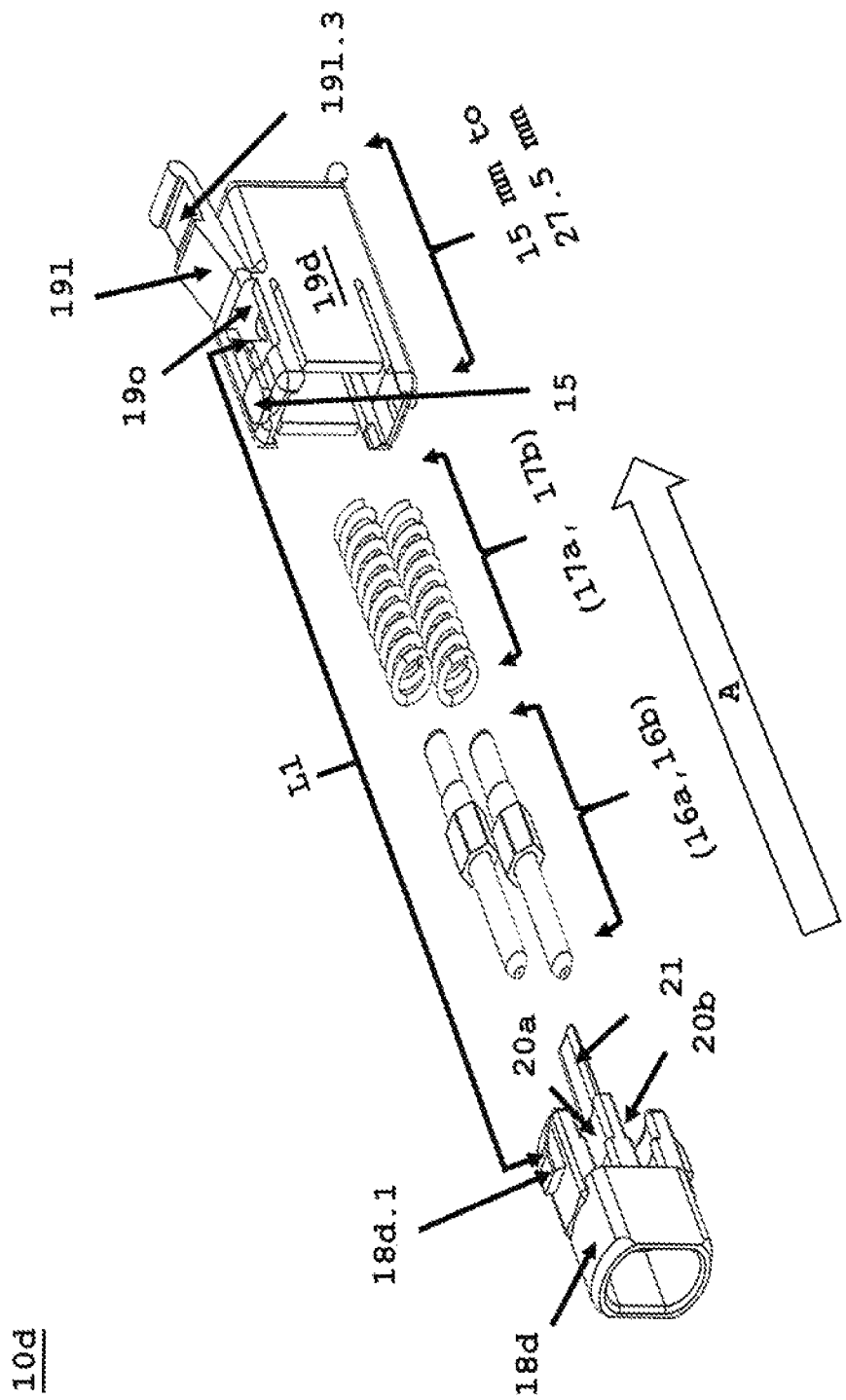
FIG. 7 is an exploded view of a behind-the-wall connector according to an of embodiment of the present invention.

FIGS. 5-7 are exploded views that depict an outer housing (19b-19d) with an external release latch (191) that is received within a latch recess (40e.1-40e.4) formed at one end of an adapter. FIG. 5 depicts behind-the-wall connector (10b). The external latch allows a user to depress the latch and remove the behind-the-wall connector (10b-10d) from its corresponding adapter latch recess (40e.1-40e.4). For connector (10b), protrusions (18b.1, 18b.2) are formed as part of inner body (18b) and are received in a corresponding opening (19o) formed on one-side of outer housing (19b), which is about 15 mm in length, along latch line (L1) to assemble connector (10b) along arrow (A), FIG. 5 alignment sleeve holder openings are similarly configured as described in FIG. 4.

FIG. 6 depicts another embodiment of the behind-the-wall connector (10c). Inner body (18c) has opposing protrusions (18c.1, 18c.2) and when the protrusions are received with openings (19O), formed as part of connector outer housing (19c), connector (10c) is assembled. Outer housing (19c) is about 15 mm to about 27.5 mm in length when assembled, along latch line (L1). Release latch (191) allows, a user to remove assembled connector (10c) from its adapter port recess (40e.1-40e.4). Flange (18d.3) secures inner body within outer housing. Chamfer (191.2) on latch (191) helps prevent jamming of the connector when inserted into an adapter port. Protrusion (19p) on the adapter release latch (191) secures the connector (10c) within a cut-out or recess within the adapter port.

FIG. 7 depicts an exploded view of behind-the-wall connector (10d) with an external release latch (191) positioned at the most distal end (D) of connector housing (19d). This is a two-piece design with a connector outer housing (19d) and a front housing or inner body (18d). Unlike release latch (191) of FIG. 5, which is disposed at the most proximal end (P) of the outer housing (19d). Latch (191) further comprises recess (191.3) that is engaged with corresponding inner structure of the adapter port to help secure the connector (10d) within the adapter. Outer housing (19d) length is about 1.5 mm to about 27.5 mm. Connector (10d) is formed when protrusions (18d.1, 18d.2) are received within a corresponding opening (19o) on opposing sides of connector outer housing (19d) along latch line (L1), to form the connector (10d) when assembled in direction of arrow (A). Unlike FIGS. 4-6 alignment sleeves (22a, 22b), the alignment sleeves of connector (10d) are formed as part of inner body (18d), and like FIG. 3, the open alignment sleeve allows more clearance when assembling the connector. Alignment sleeve holder openings in FIG. 7 are similar configured as described in FIG. 3. FIG. 7 inner body (18d) is similar constructed as FIG. 3 inner body (14), with open sidewalls and an inner shelf (21).

Figure 8:
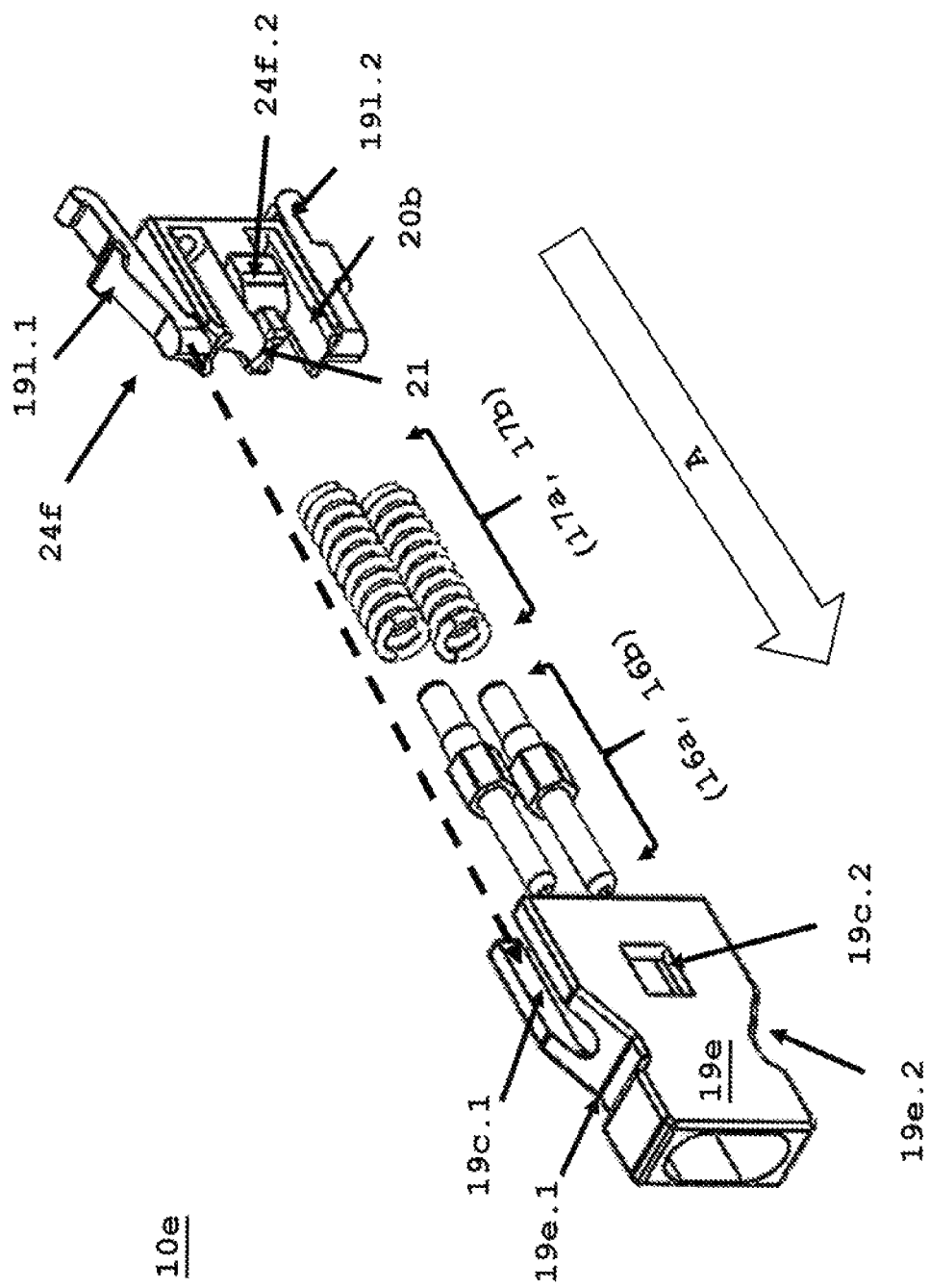
FIG. 8 is an exploded view of a behind-the-wall connector according to an of embodiment of the present invention.

FIG. 8 depicts another embodiment of a behind-the-wall fiber optic connector (10e). As described above an outer housing (19e) accepts one or more ferrule assembly (16a, 16b) with backbody (24f) securing one or more bias spring (17a,17b) at a distal end of the corresponding ferrule assembly (16a, 16b), and within outer housing (19e), which forms connector (10e) along arrow (A). Outer housing (19e) has opposing channels (19c.1, 19c.2) configured to accept backbody (24f) opposing chamfer (191.1, 191.2), which reduces the overall length of connector (10e) to about 15 mm. A pair of opposing side locking tabs (24f.1, 24f.2) are received in a corresponding outer housing channel (19c.1, 19c.2), which secures backbody (24f) with outer housing (19e) thereby forming connector (10e). Adapter release latches (18e.1, 18e.2) are received in opposing recesses (40e.1) formed in reduced length adapter housing (47) (refer to FIG. 1B). Deploying a reduced length adapter housing is possible with the connector improvements described in this disclosure.

Figure 9:
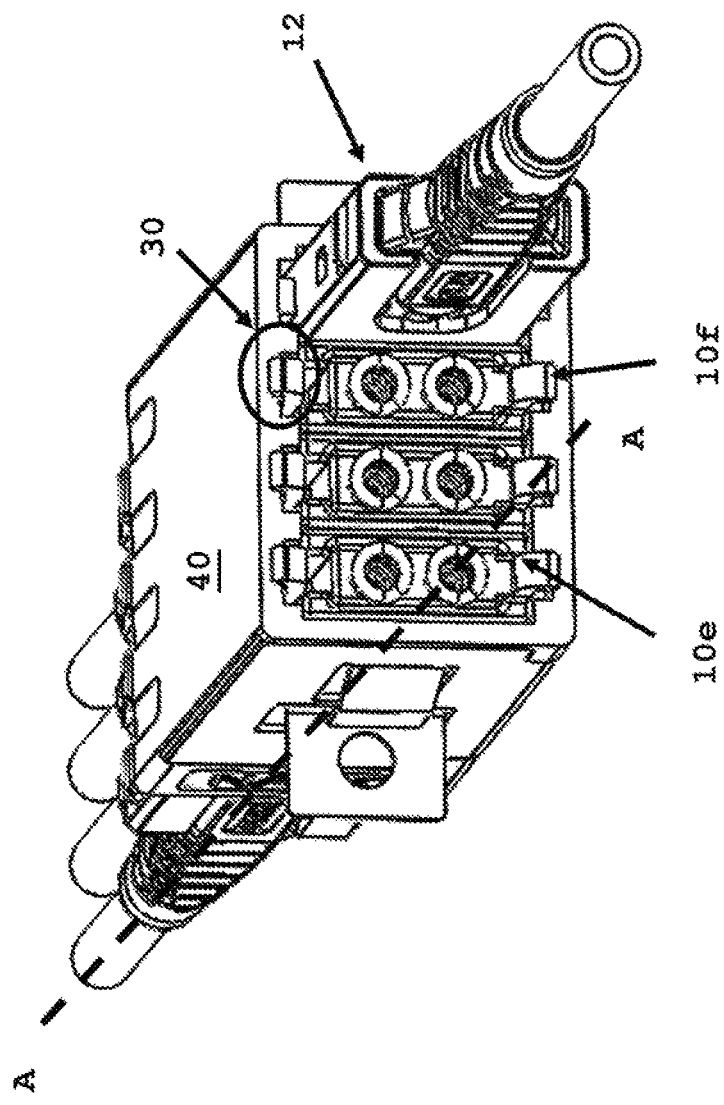
FIG. 9 is a rear perspective view of behind-the-wall connectors within an adapter port.

FIG. 9 depicts connectors (10e) secured with one or more adapter ports of a prior art adapter (40). Without departing from the scope of the invention, connector (10e) can be secured within a port of a reduced length adapter (48) (refer to FIG. 2). Connector (10f) can be secured in a second port near connector (10e) and alongside data connector (12). Call-out (30) depicts adapter latch release (191) with protrusion (19p) secured within a cut-out (40h.1) (refer to FIG. 10), formed within the wall of the adapter port. The cut-out does not extend through the outer wall of the adapter.

FIG. 10 depicts a section view along line A-A of FIG. 9. Behind-the-wall connector (10e) is being removed in direction of arrow (R) and adapter latch arms (40j.1, 40j.2) rotates (RD) out of respective connector widthwise recess (11.1, 11.2) into cut-outs within adapter housing (40i.1, 40i.2) as user depresses latch (191) in direction of (D) and pulls in direction of (R). When adapter release latch (191) is depressed in direction of arrow (D), protrusion (19p) is pushed out of cut-out (40h.1), so the user can pull the connector (10e) distally or rearward to remove the connector (10e) from the adapter port. Adapter latch arms (40j.2) is received in connector widthwise recess (11.2) when the connector is fully inserted into the adapter port. Stop surface (40g.1) prevents adapter latch hook from being moved out of connector recess until a pull force is exceeded.

Figure 11A:
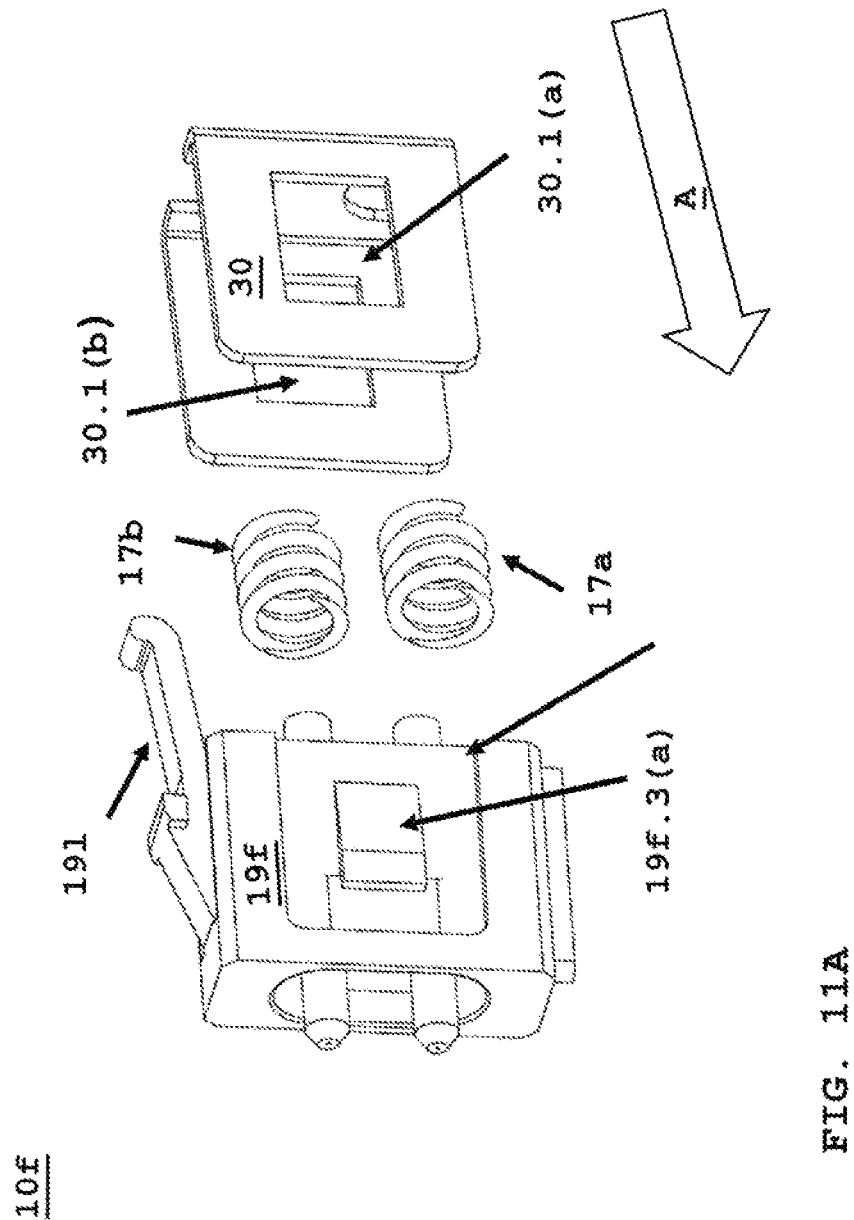
FIG. 11A is an exploded view of another embodiment of the present invention.

FIG. 11A depicts an exploded view of an externally mounted retainer clip (30) prior to securing to an outer connector housing (19f). The clip (30) has a pair of opening (30.1(a), 30.1(b)) and is secured with the opposing retainer latches (19f.3(a), 19f.3(b) (not shown)) to a first end of the outer housing, the clip secures at least one ferrule assembly with a ferrule and an optical fiber therein, with the outer housing. The clip (30) sidewalls (30.5b, 30.5c) (refer to FIG. 13) may be received in a recess (10r) (refer to FIG. 12).

FIG. 11B.1 depicts an assembled side view of a behind-the-wall connector (19f) deploying the external retainer clip (30). FIG. 11B.2 is a cross-section view along line A-A of FIG. 11B.1, illustrating reduced length (Lm) and reduced width (Lw) with the retainer clip (30) securing the ferrule assembly (16) and bias spring (17) within the connector outer housing.

Figure 11C:
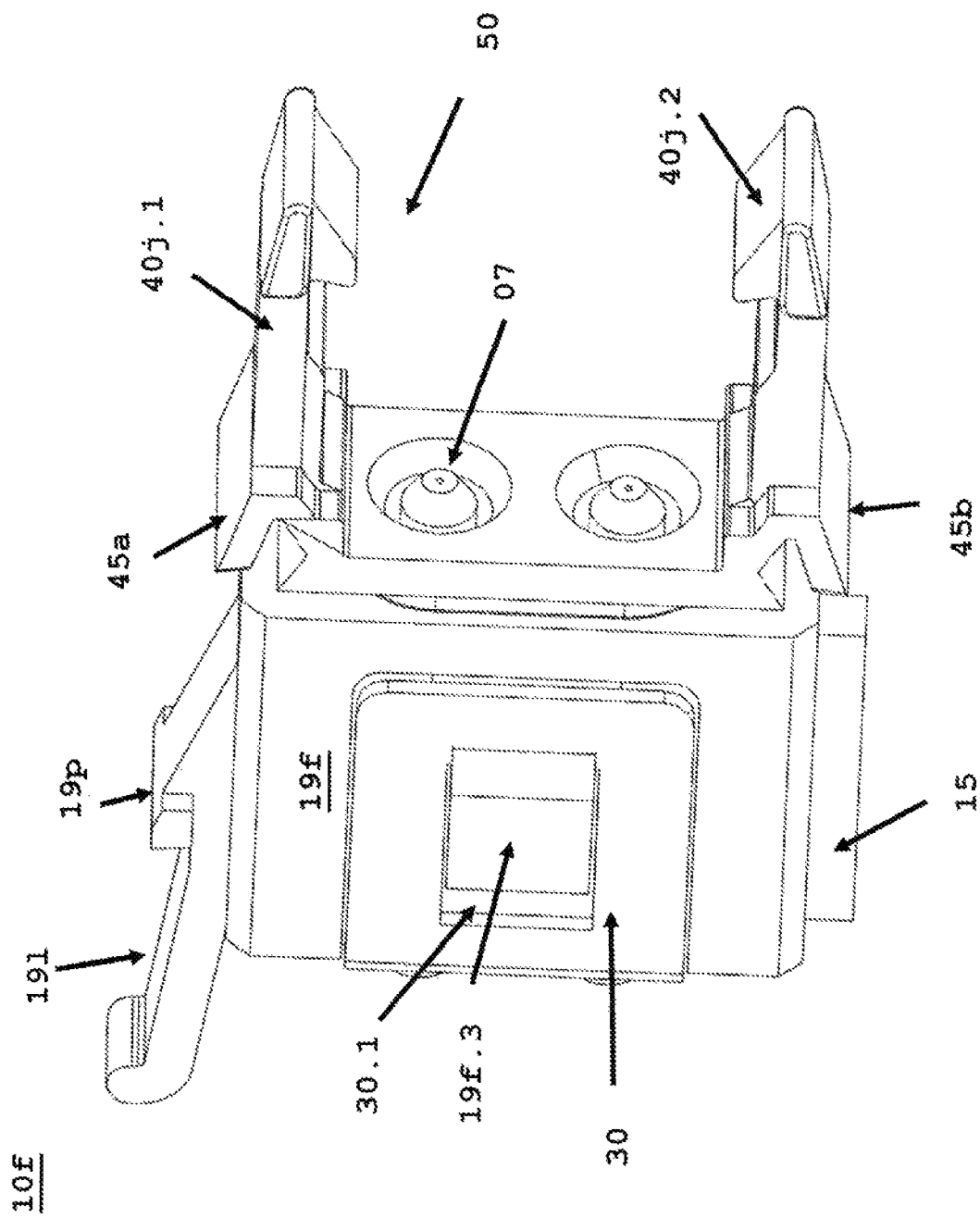
FIG. 11C is a side perspective view of an another embodiment of a behind-the-wall connector.

FIG. 11C depicts another embodiment of the behind-the-wall connector (10f). Adapter release latch (191) secures connector (10f) within an adapter port when protrusion (19p) is received within a corresponding recess (40e.1-40e.4) formed on the inner housing of the adapter or part of the adapter latch assembly (refer to FIG. 12A). Outer housing (19f) receives an externally mounted retainer clip (30) that is secured behind connector outer housing latch (19f.3). Connector outer housing release latch (19f.3) is accepted within an opening (30.1) of externally mounted retainer clip (30). A corresponding externally mounted retainer latch is provided on the opposing sidewalls of the connector outer housing (19f) that is accepted in a corresponding opening of the externally mounted retainer clip (30). Panel latch (19f.4) secures the adapter to the panel (08) as shown in FIG. 12A when the adapter housing is secured within a panel opening. A behind-the-wall connector latch assembly (50) has a pair of opposing latch arms (40j.1, 40j.2) that secures an opposing connector with opposing recesses such as connector (12.1) or connector (10). Ferrules (07) of connector (10f) protrude through openings of a frame, that connects opposing connector latch arms, for behind-the-wall latch connector assembly (50). Latch assembly (50) has opposing connector latch arms (40j.1, 40j.2) that are configured to secure connector (12.1) or behind-the-wall connector (10) as disclosed in FIGS. 3, 5-8. Cut-outs (11.1, 11.2) receive the opposing latch arms (40j.1, 40j.2) as disclosed in FIG. 3. Opposite to latch (191) is an alignment key (15) that ensure the connector (10f) is oriented in the correct polarity.

FIG. 12A depicts connector (10f) secured within an adapter (49) port. Adapter (49) has an upper indexing channel (49u.2) and a lower indexing channel (491.2) that requires the connector (10f) to be properly oriented with alignment key (12d) received in lower channel (491.2) for a first polarity with an opposing connector (not shown) so an optical signal can be transmitted along the optical axis (L-L'). Retaining wall (49r.1) is configured to limit rotation or lateral movement of connector (10f) when secured within the reduced length adapter (49). FIG. 12A depicts externally retained clip (30) with a recess of outer housing sidewall (10r) and cut-out (30.2). Call-out (19g.1) depicts outer housing latch hook or retainer latch (19f.3) securing clip (30) to connector outer housing. Connector (10f) is secured within an adapter port when protrusion (10p) is accepted with corresponding recess (40e.1-40e.4). The recess may be a cut-out formed within the inner wall of the adapter port, and not extend through the housing wall without departing from the scope of the invention.

Figure 12B:
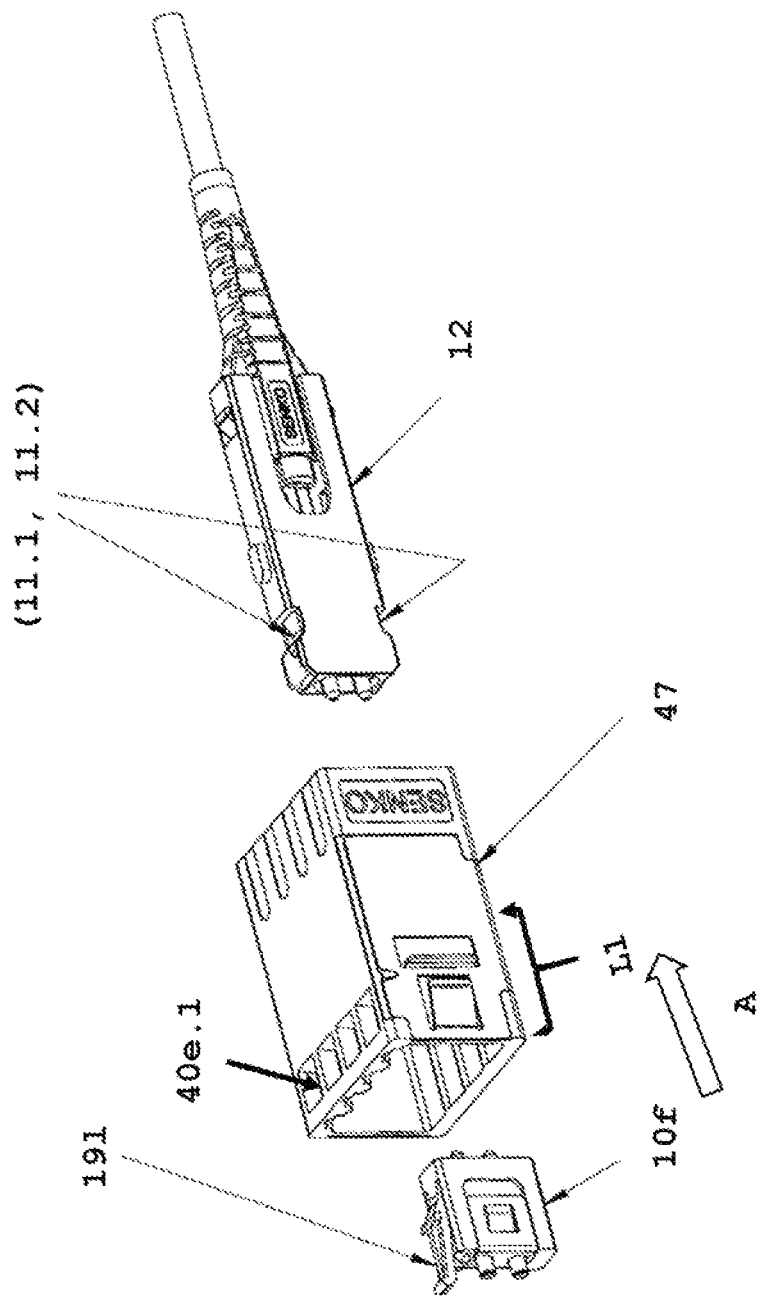
FIG. 12B is an exploded view of FIG. 1B without panel.
Figure 12E:
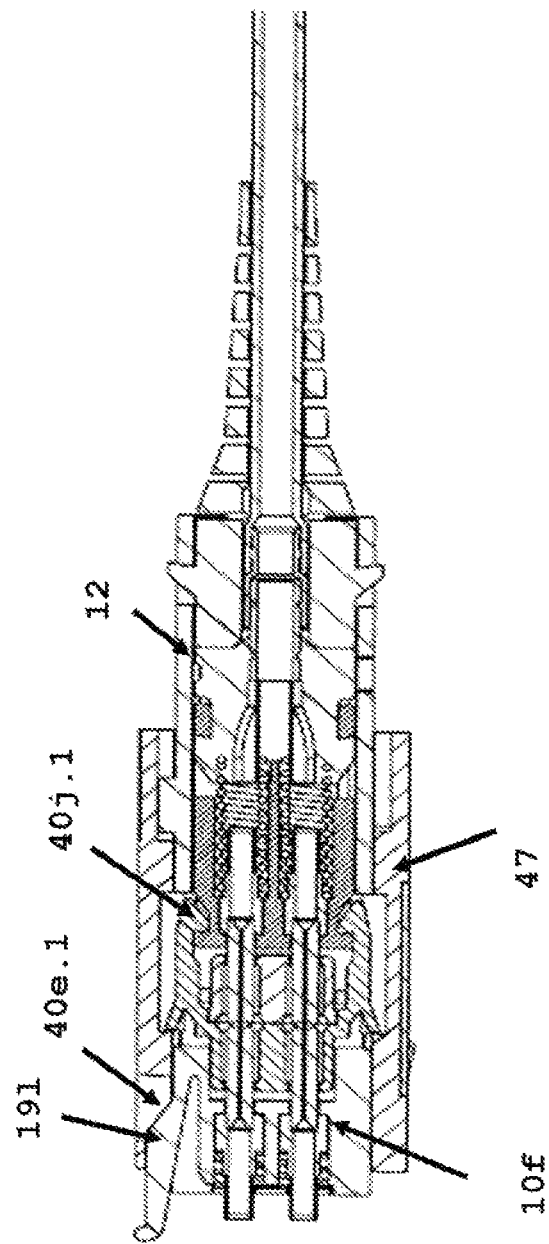
FIG. 12E is a cross-section view of FIG. 12B assembled.

FIG. 12B depicts an exploded view of a behind-the-wall connector (10f) as described above in FIG. 11A and FIG. 11B prior to inserting in a first port of a reduced length adapter (47), where the adapter port length (L1) on a first side is at least 25% less in length than an port necessary to secure a prior art data center connector (12), on a second side, in optical communication with the connector (10f). Adapter latch release arm secures connector (10f) with a corresponding recess or opening (40e.1) thereby securing the connector (10f) in the first port in the direction of arrow (A). FIG. 12C is a top view of reduced length adapter (47) along line A-A accepting a behind-the-wall connector (10f) in a first port on a first side opposite a prior art data center (12) in a first port on a second side. FIG. 12D depicts a cross-section of FIG. 12C along line A-A showing adapter latch hooks (40j.1, 40j.2) that secure the data center connector within its port. Latch hooks (40j.1, 40j.2) are received in a corresponding widthwise recess (11.1, 11.2). FIG. 12E depicts a cross section of connector (10f) opposing data center connector (12) inserted within adapter (47). Connector (10f) latch arm (191) is secures connector (10f) when protrusion (19p) is received in recess (40e.1). Data center connector (12) is secured as described above.

Figure 13:
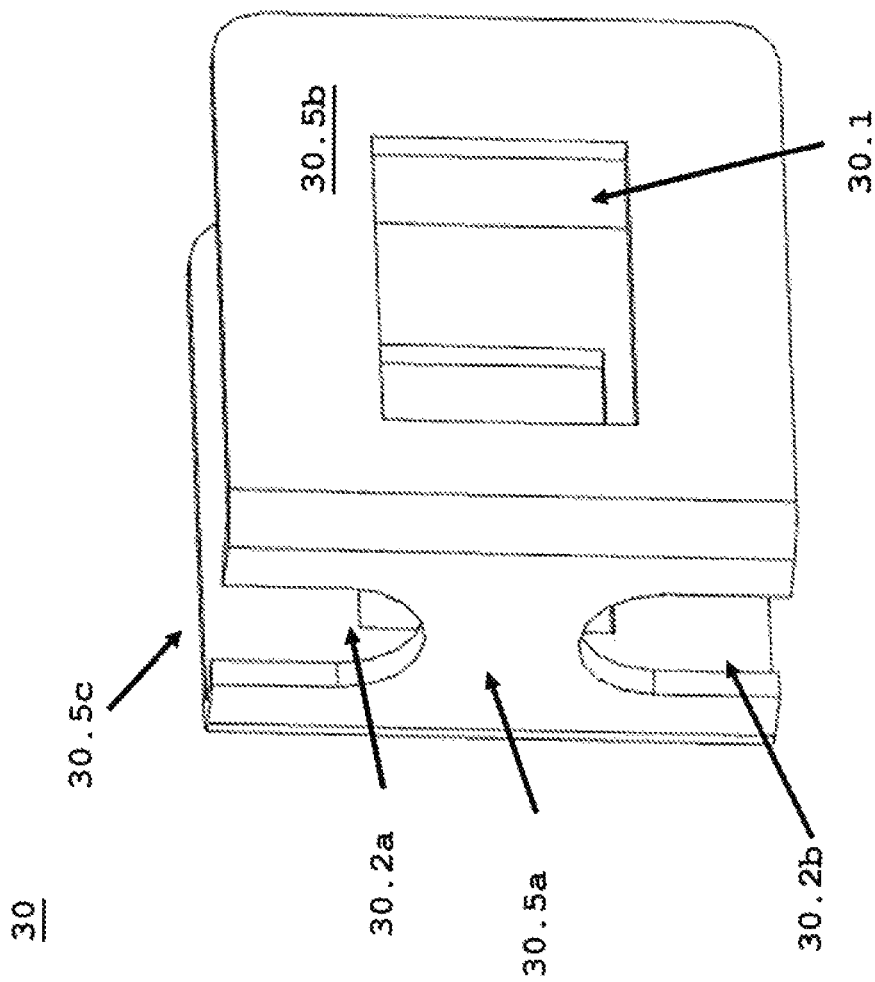
FIG. 13 is a perspective view of an externally mounted retainer clip forming the connector of the present invention of FIG. 11A.

FIG. 13 depicts externally mounted retainer clip (30) with main body comprising front body portion (30.5a) with opposing cut-outs (30.2a, 30.2b), and opposing sidewalls (30.5b, 30.5c) which forms a generally U-shaped channel that is configured to accept a distal end of the ferrule assembly and spring when the externally mounted retainer clip (30) is secured to the connector outer housing (19f) as discussed in the FIG. 12A above. The externally mounted retainer clip (30) has two sidewall portions (30.5b, 30.5c) that are perpendicular to the front body portion (30.5a). Each side wall portion further comprises an opening (30.1) that accepts a corresponding panel latch as described in FIG. 11 above. As depicted in FIG. 12A, the clip (30) may be accepted in recess (10r) formed in the connector outer housing (19f).

Figure 14:
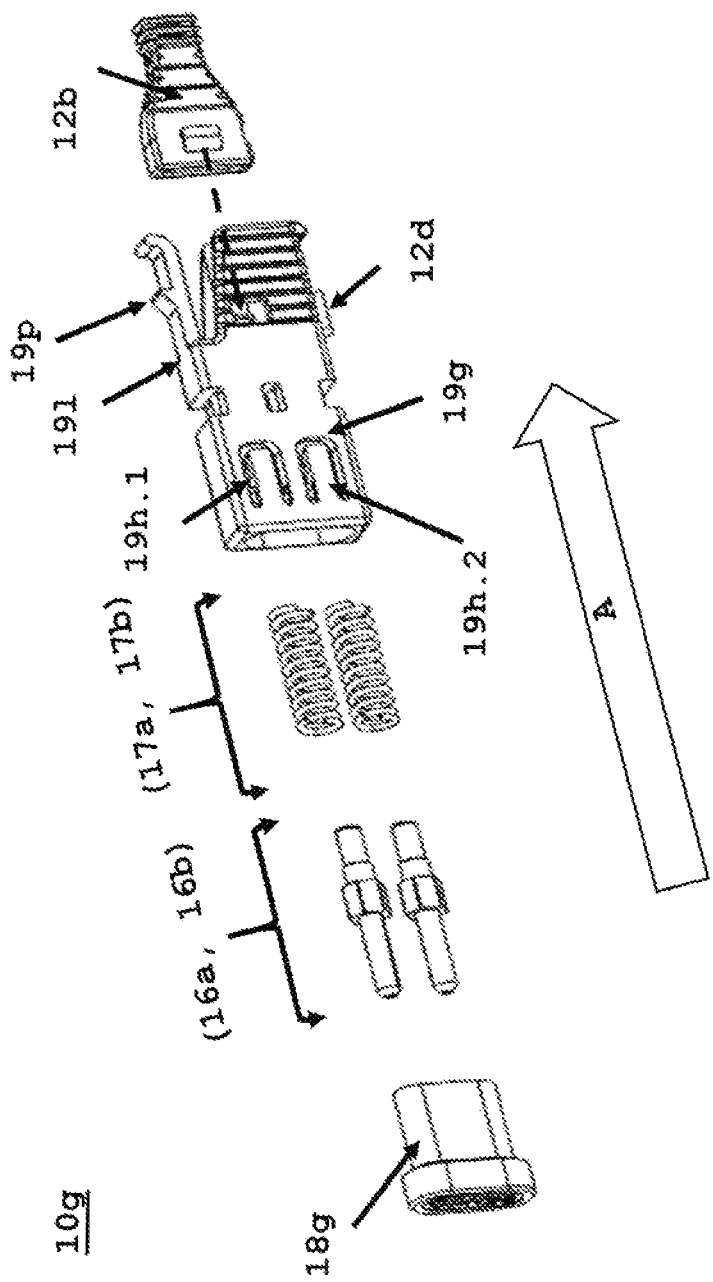
FIG. 14 is an exploded view of another embodiment of another behind-the-wall fiber optic connector with a cable boot release.

FIG. 14 depicts an exploded view of another embodiment of the behind-the-wall connector (10g). Inner housing (18g) accepts corresponding ferrule assembly (16a, 16b) and bias springs (17a, 17b). Connector outer housing (19g) further comprises flexible retainer clip latches (19h.1, 19h.2) formed as part of housing wall (19g), the flexible latches are biased inward with perpendicular tabs (19t.1, 19t.2) (refer to FIG. 16), and when the ferrule assembly is inserted in the direction of the arrow (A), the ferrule flanges are secured behind their corresponding latch (19h.1, 19h.2) and secured within the outer housing by a corresponding tab (19t.1) formed as part of a latch (19h.1). There are a corresponding pair of flexible latches opposite flexible latches (19h.1, 19h.2) on the opposite side of connector outer housing (19g). Once ferrule assembly and spring are secured within the housing (19g), an optional cable release boot (12b) is secured to a distal end of housing (19g) along the dotted line. Connector (10h) is formed. Connector outer housing (19h) has an external release latch (19l) that is formed as part of the connector outer housing. The user operates connector (10g) similar as described in FIG. 10. Protrusion (19p) is accepted into recess (40h.1) to secure the connector within an adapter. Thus, connector (10h) can be used with reduced length adapter (48) reducing overall opposing connector/adapter system length by about 50 mm. Connector (10g) is removed from the adapter port by pulling on the boot (12b) or outer housing (19h) in a rearward direction.

Figure 15:
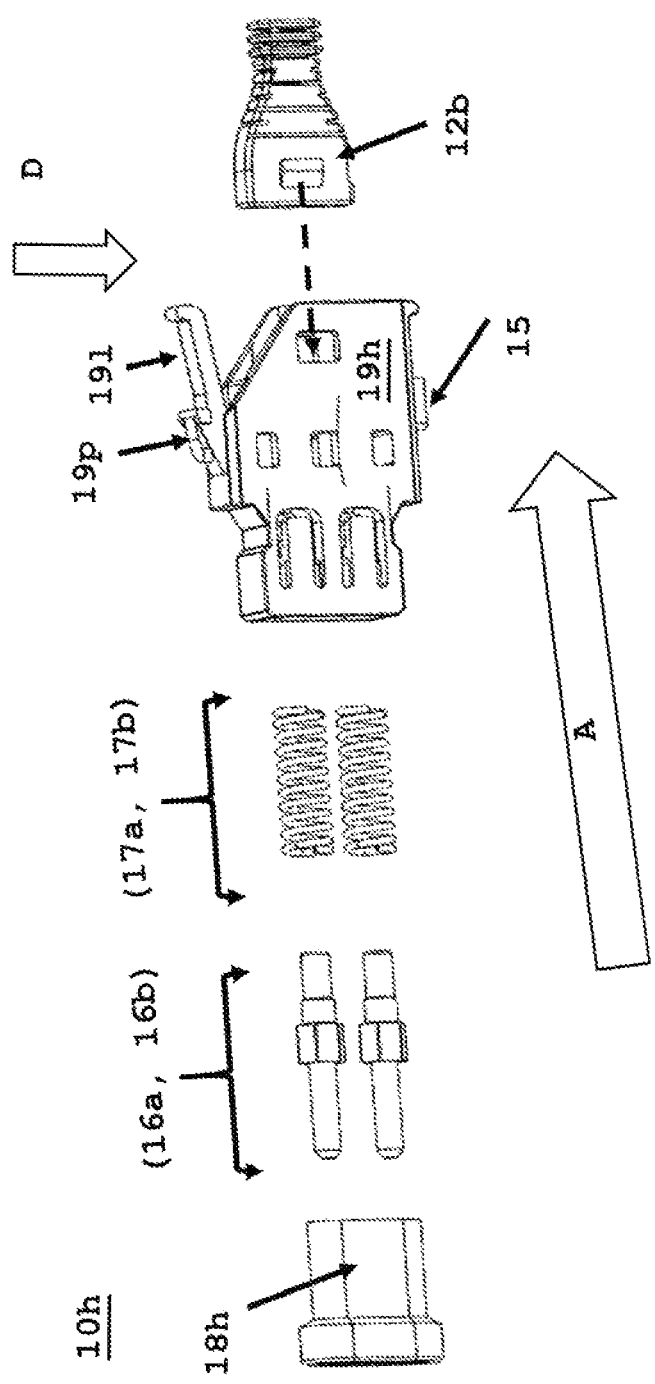
FIG. 15 is an exploded view of another behind-the-wall fiber optic connector with a cable boot release.

FIG. 15 is similar assembled as described in FIG. 14 above. Inner housing (18h) accepts corresponding ferrule assembly (16a, 16b) and bias springs (17a, 17b). FIG. 15 outer housing (19h) deploys latch (19l) toward a proximal end of the connector housing (19h). Connector (10h) is assembly in direction of arrow (A).

Figure 16:
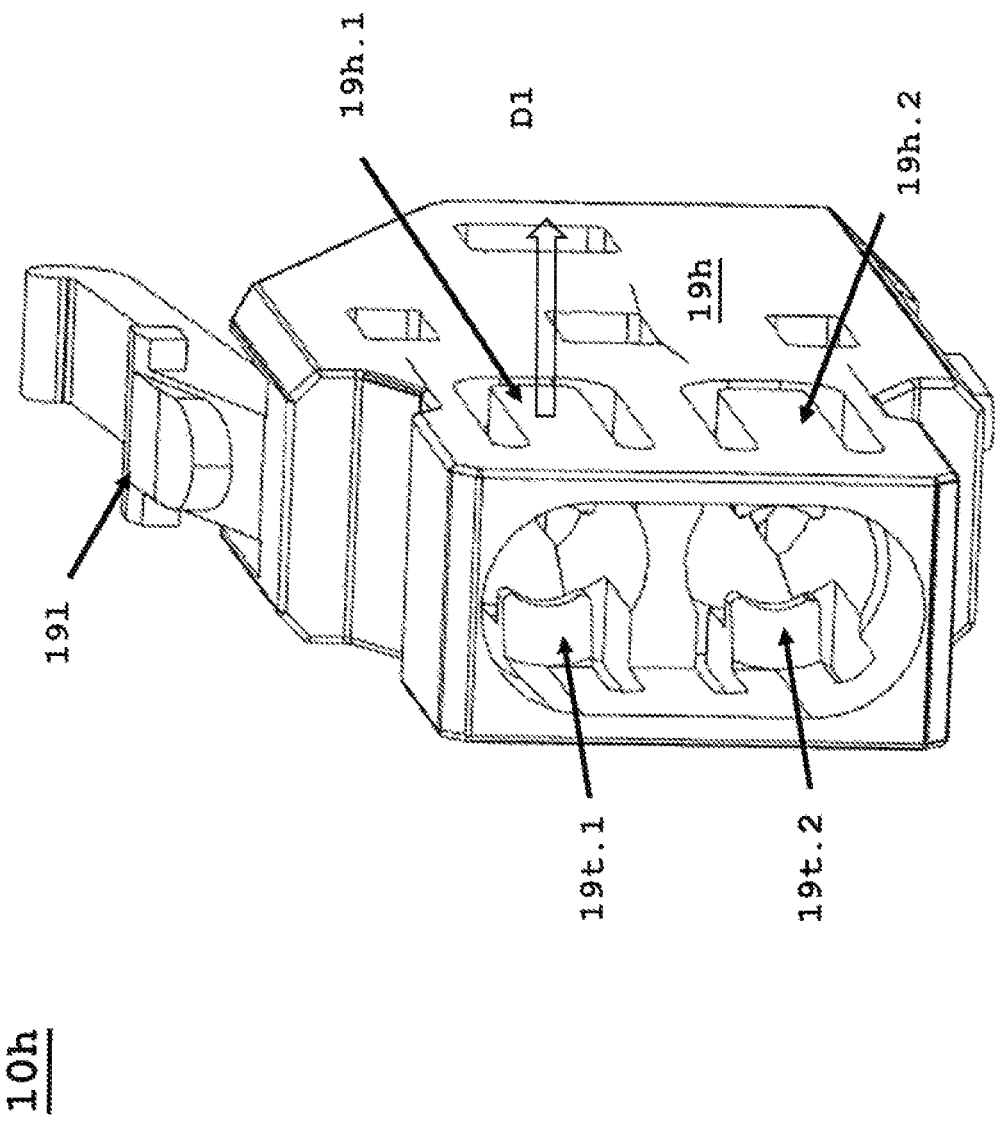
FIG. 16 is a front view of FIG. 15.

FIG. 16 depicts a proximal end view showing flexible latches (19h.1, 19h.2) formed as part of the outer housing (19h) with perpendicular tabs (19t.1, 19t.2) therein are displaced outward in direction of arrow (Dl), when the ferrule flange extends beyond the tabs. The tabs move inward in front of the ferrule flange thereby securing the ferrule assembly and spring within the housing (19h), as the ferrule assembly and spring are inserted from a proximal end of the connector (10h).

FIG. 17 depicts a distal view of connector (10h) with pair of flexible latches (19h.1a, 19h.2a) formed as part of a first sidewall (19s.1) and opposing flexible latches (not shown) formed as part of a second sidewall (19s.2). The ferrule assembly (17a, 17b) and a corresponding bias spring (16a, 16b) are retained between a retainer wall (17f) that is an integrated blackbody and the corresponding perpendicular tab (19t.1, 19t.2).

FIG. 18A depicts behind-the-wall connector (10g) secured within reduced length adapter (47) and connector (10g) is in optical communication with an opposing prior art fiber optic connector (12). Connector (10g) further comprises an exterior housing (52) which is secure to outer housing of the connector (10g) when protrusion (19p) is secured within opening (52.1). To remove connector (10g) from the adapter port, the user depresses adapter release arm and pulls on connector cable boot (12b) in a rearward direction, or away from the adapter port. FIG. 18B depicts FIG. 18A with exterior housing removed. Connector (10g) is secured when protruding ferrules (7) are captured within a corresponding alignment sleeve (22a, 22b).

Figure 19:
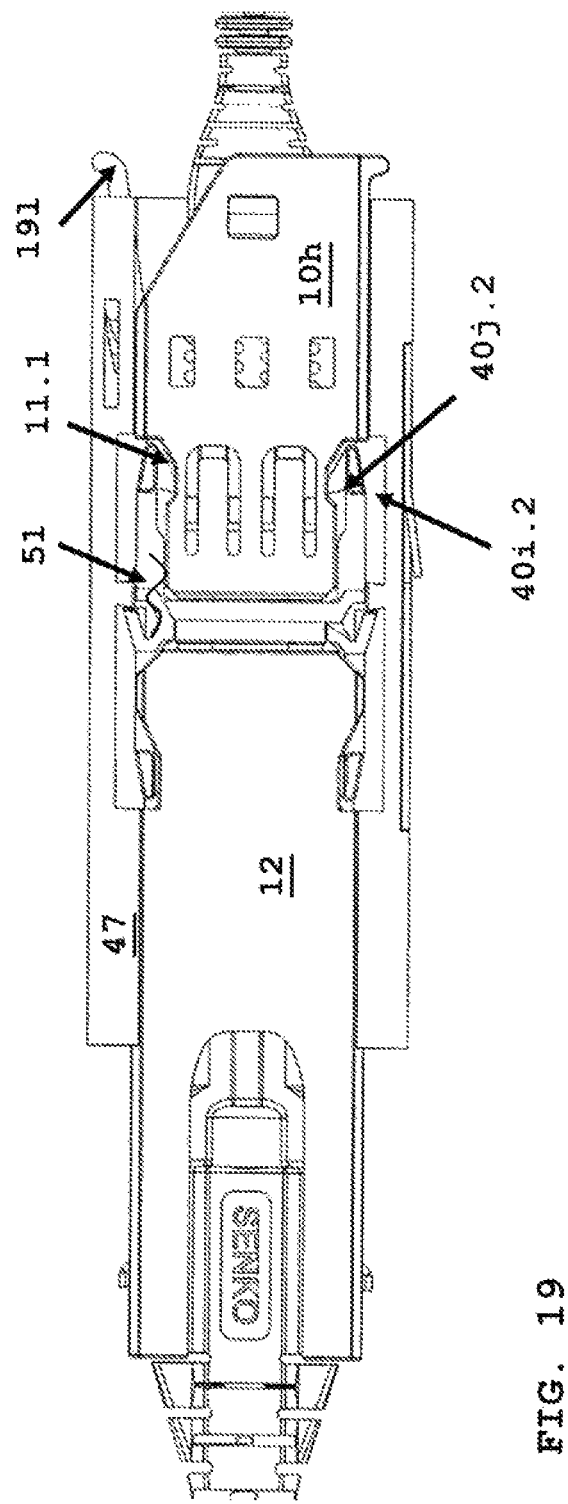
FIG. 19 is cross-section of another embodiment of the behind-the-wall connector opposing a prior art data center connector.

FIG. 19 depicts a second behind-the-wall connector (10h) secured opposite a prior art data center connector (12). A second behind-the-wall latch assembly (51) secures both connectors with opposing latch arms (40j.2) within a width-wise recess (11.1) when each connector is secured within their respective adapter port. FIG. 10 above describes the operation of removing connector (10h) from its adapter port.

The above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In an instance where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A behind-the-wall optical connector, comprising:
an outer housing having a first, front end and a second, back end, the outer housing comprising a first housing sidewall and a second housing sidewall;
first and second optical fiber ferrules in the outer housing, each of the first and second optical fiber ferrules comprising a flange;
first and second ferrule springs disposed rearward of the first and second optical fiber ferrules for urging the first and second optical fiber ferrules forward in the outer housing, each of the first and second ferrule springs having a front end and a back end;
a spring retainer formed within the outer housing and configured to form a stop for the back ends of the first and second ferrule springs such that the first and second ferrule springs can be compressed between the first and second optical fiber ferrules and the spring retainer,
wherein the outer housing further comprises opposing flexible side tabs formed as part of the first housing sidewall and the second housing sidewall, the opposing flexible side tabs being configured to secure the flanges of the first and second optical fiber ferrules to prevent the first and second ferrule springs from displacing the first and second optical fiber ferrules forwardly out of the outer housing, wherein the flexible side.

2. The behind-the-wall optical connector according to claim 1, wherein the outer housing further comprises an external adapter latch, the external adapter latch is used to release the connector from an adapter port.

3. The behind-the-wall optical connector according to claim 1, wherein the first and second optical fiber ferrules are LC ferrules.

4. The behind-the-wall optical connector of claim 2, wherein the outer housing further comprises an alignment key opposite the external adapter latch to ensure the behind-the-wall connector is inserted into the adapter port in the correct polarity orientation.

5. The behind-the-wall optical connector according to claim 1, wherein the outer housing further comprises an upper wall and an opposite lower wall extending from the first, front end to the second, back end, the upper wall and the lower wall extending widthwise from the first housing sidewall to the second housing sidewall.

6. The behind-the-wall connector according to claim 5, wherein the outer housing further comprises a first recess formed in the upper wall and a second recess formed in the lower wall, the first recess and the second recess configured to receive opposing adapter latch hooks of a mating adapter.

7. The behind-the-wall optical connector according to claim 6, wherein the upper wall further comprises a depressible adapter latch rearward of the first recess, the depressible adapter latch configured to releasably retain the behind-the-wall connector in the mating adapter.

8. The behind-the-wall connector as according to claim 7, wherein the first and second recesses are configured to displace the opposing adapter latch hooks of the mating adapter out of the first and second recesses when the depressible adapter latch is depressed and the behind-the-wall connector is pulled rearward from the mating adapter.

9. The behind-the-wall connector according to claim 8, wherein the each of the first and second recesses comprises a front end defined by a surface of the respective one of the upper and lower walls that is angled to slope inward heightwise as the surface extends rearward longitudinally.

10. The behind-the-wall optical connector of claim 6, wherein the lower wall comprises an alignment key rearward of the second recess.

* * * * *